United States Patent
Wang et al.

(10) Patent No.: US 10,425,923 B2
(45) Date of Patent: Sep. 24, 2019

(54) UPLINK CHANNEL MULTIPLEXING AND WAVEFORM SELECTION

(71) Applicant: QUALCOMM Incorporated, San Diego, CA (US)

(72) Inventors: Renqiu Wang, San Diego, CA (US); Hao Xu, San Diego, CA (US); Wei Zeng, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 15/440,947

(22) Filed: Feb. 23, 2017

(65) Prior Publication Data

US 2018/0035422 A1 Feb. 1, 2018

Related U.S. Application Data

(60) Provisional application No. 62/369,717, filed on Aug. 1, 2016.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0007* (2013.01); *H04L 5/0028* (2013.01); *H04L 5/0048* (2013.01); *H04L 5/0051* (2013.01); *H04L 5/0053* (2013.01); *H04L 5/26* (2013.01); *H04L 41/0896* (2013.01); *H04W 72/0446* (2013.01); *H04L 5/0092* (2013.01); *H04L 27/0008* (2013.01)

(58) Field of Classification Search
CPC .......... H04W 72/0413; H04W 72/0446; H04L 5/0007; H04L 5/0028; H04L 5/0048; H04L 5/0051; H04L 5/0053; H04L 5/0092; H04L 5/26; H04L 41/0896
See application file for complete search history.

(56) References Cited

U.S. PATENT DOCUMENTS

| 9,769,699 | B2 * | 9/2017 | Tseng ...................... H04W 4/70 |
| 2010/0034152 | A1 * | 2/2010 | Imamura ............... H04L 5/0007 370/329 |

(Continued)

OTHER PUBLICATIONS

ISA/EPO, Partial International Search Report of the International Searching Authority, Int'l. App. No. PCT/US2017/043211, dated Oct. 27, 2017, European Patent Office, Rijswijk, NL, 13 pgs.

(Continued)

*Primary Examiner* — Afsar M Qureshi
(74) *Attorney, Agent, or Firm* — Holland & Hart LLP

(57) ABSTRACT

Methods, systems, and devices for wireless communication are described that provide for uplink channel multiplexing and waveform selection. Uplink channels to be transmitted from one or more user equipment (UEs) to a base station are multiplexed together or separately into an uplink subframe. Each UE is capable of using different waveforms to transmit different channels. Reference signals are communicated according to an RS pattern, which is symmetric across uplink and downlink channels.

13 Claims, 19 Drawing Sheets

(51) Int. Cl.
*H04L 5/26* (2006.01)
*H04L 12/24* (2006.01)
*H04L 27/00* (2006.01)

(56) References Cited

U.S. PATENT DOCUMENTS

| | | | | |
|---|---|---|---|---|
| 2011/0128909 | A1* | 6/2011 | Luo | H04L 5/0023 |
| | | | | 370/328 |
| 2012/0120885 | A1* | 5/2012 | Wang | H04W 72/04 |
| | | | | 370/329 |
| 2014/0146754 | A1* | 5/2014 | Bayesteh | H04L 1/0001 |
| | | | | 370/329 |
| 2014/0254708 | A1* | 9/2014 | Seo | H04B 7/0626 |
| | | | | 375/267 |
| 2015/0092528 | A1* | 4/2015 | Luo | H04L 1/0025 |
| | | | | 370/210 |
| 2015/0181589 | A1* | 6/2015 | Luo | H04B 7/0452 |
| | | | | 370/329 |
| 2015/0382222 | A1* | 12/2015 | Park | H04L 1/00 |
| | | | | 370/252 |
| 2017/0180100 | A1* | 6/2017 | Lee | H04L 5/0032 |
| 2018/0083751 | A1* | 3/2018 | Seo | H04L 5/00 |
| 2018/0227885 | A1* | 8/2018 | Lee | H04J 11/00 |

OTHER PUBLICATIONS

ISA/EP, International Search Report and Written Opinion of the International Searching Authority, Int'l Application No. PCT/US2017/043211, dated Feb. 9, 2018, European Patent Office, Rijswijk, NL, 22 pgs.

Nokia et al., "On the Cross-Link Interference Mitigation," 3GPP TSG-RAN WG1 Meeting #85, R1-165375, Nanjing, P.R. China, May 23-27, 2016, 3 pgs., XP051096649, 3rd Generation Partnership Project.

* cited by examiner

UPLINK CHANNEL MULTIPLEXING AND WAVEFORM SELECTION

CROSS REFERENCES

The present application for patent claims priority to U.S. Provisional Patent Application No. 62/369,717 by Wang, et al., entitled "Uplink Channel Multiplexing and Waveform Selection," filed Aug. 1, 2016, assigned to the assignee hereof, and which is expressly incorporated by reference herein.

INTRODUCTION

The following relates generally to wireless communication, and more specifically to uplink channel multiplexing and waveform selection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) or LTE-Advanced (LTE-A) system). A wireless multiple-access communications system may include a number of base stations, each simultaneously supporting communication for multiple communication devices, which may be otherwise known as user equipment (UE).

In a wireless communications system, a UE may transmit one or more uplink channels (a physical uplink shared channel (PUSCH), a physical uplink control channel (PUCCH), a sounding reference signal (SRS), or an ultra-reliable low-latency communications channel (URLCC), etc.) when communicating with a base station. The channels may be transmitted in a single uplink subframe and in some instances, multiple UEs may each transmit one or more channels in a single uplink subframe. However, depending on the channel type, link-budget, available power, or other factors, transmitting a channel according to one waveform (such as an orthogonal frequency division multiplexing (OFDM) waveform) may be more inefficient than transmitting the same channel according to a different waveform (such as a single carrier FDM (SC-FDM) waveform). Further, performing uplink and downlink communications in subsequent subframes having different channel structures may limit the reuse ability of the transmitter or receiver.

SUMMARY

A method of wireless communication is described. The method may include identifying an uplink subframe for communication with a base station, selecting a first waveform for a transmission of data in the uplink subframe, selecting a second waveform for transmission of a reference signal (RS) in the uplink subframe, and transmitting the data and the RS in the uplink subframe, the data transmitted according to the selected first waveform and the RS transmitted according to the selected second waveform.

An apparatus for wireless communication is described. The apparatus may include means for identifying an uplink subframe for communication with a base station, means for selecting a first waveform for a transmission of data in the uplink subframe, means for selecting a second waveform for transmission of an RS in the uplink subframe, and means for transmitting the data and the RS in the uplink subframe, the data transmitted according to the selected first waveform and the RS transmitted according to the selected second waveform.

Another apparatus for wireless communication is described. The apparatus may include a processor, memory in electronic communication with the processor, and instructions stored in the memory. The instructions may be operable to cause the processor to identify an uplink subframe for communication with a base station, select a first waveform for a transmission of data in the uplink subframe, select a second waveform for transmission of an RS in the uplink subframe, and transmit the data and the RS in the uplink subframe, the data transmitted according to the selected first waveform and the RS transmitted according to the selected second waveform.

A non-transitory computer readable medium for wireless communication is described. The non-transitory computer-readable medium may include instructions operable to cause a processor to identify an uplink subframe for communication with a base station, select a first waveform for a transmission of data in the uplink subframe, select a second waveform for transmission of an RS in the uplink subframe, and transmit the data and the RS in the uplink subframe, the data transmitted according to the selected first waveform and the RS transmitted according to the selected second waveform.

Some examples of the method, apparatus, and non-transitory computer-readable medium described above may further include processes, features, means, or instructions for identifying an additional uplink subframe for communication with the base station. Some examples of the method, apparatus, and non-transitory computer-readable medium described above may further include processes, features, means, or instructions for selecting a third waveform for an additional transmission of data in the additional uplink subframe, the third waveform being different from the first waveform. Some examples of the method, apparatus, and non-transitory computer-readable medium described above may further include processes, features, means, or instructions for transmitting the data in the additional uplink subframe according to the selected third waveform.

Some examples of the method, apparatus, and non-transitory computer-readable medium described above may further include processes, features, means, or instructions for identifying an additional uplink subframe for communication with the base station. Some examples of the method, apparatus, and non-transitory computer-readable medium described above may further include processes, features, means, or instructions for selecting a third waveform for transmission of an additional RS in the additional uplink subframe, the third waveform being different from the second waveform. Some examples of the method, apparatus, and non-transitory computer-readable medium described above may further include processes, features, means, or instructions for transmitting the additional RS in the additional uplink subframe according to the selected third waveform.

In some examples of the method, apparatus, and non-transitory computer-readable medium described above, transmitting the data comprises: transmitting the data in the uplink subframe using a PUSCH.

In some examples of the method, apparatus, and non-transitory computer-readable medium described above, transmitting the RS comprises: transmitting a demodulation RS (DMRS) in the uplink subframe.

In some examples of the method, apparatus, and non-transitory computer-readable medium described above, transmitting the RS comprises: transmitting an SRS in the uplink subframe.

In some examples of the method, apparatus, and non-transitory computer-readable medium described above, the first waveform comprises an SC-FDM waveform or an OFDM waveform.

In some examples of the method, apparatus, and non-transitory computer-readable medium described above, the second waveform comprises an SC-FDM waveform or an OFDM waveform.

A method of wireless communication is described. The method may include identifying an uplink subframe for communication with a base station, identifying channels to be transmitted in the uplink subframe, allocating a bandwidth and a number of symbols for each identified channel based at least in part on a quantity of identified channels, and transmitting the identified channels in the uplink subframe according to the allocated bandwidth and allocated number of symbols for each identified channel.

An apparatus for wireless communication is described. The apparatus may include means for identifying an uplink subframe for communication with a base station, means for identifying channels to be transmitted in the uplink subframe, means for allocating a bandwidth and a number of symbols for each identified channel based at least in part on a quantity of identified channels, and means for transmitting the identified channels in the uplink subframe according to the allocated bandwidth and allocated number of symbols for each identified channel.

Another apparatus for wireless communication is described. The apparatus may include a processor, memory in electronic communication with the processor, and instructions stored in the memory. The instructions may be operable to cause the processor to identify an uplink subframe for communication with a base station, identify channels to be transmitted in the uplink subframe, allocate a bandwidth and a number of symbols for each identified channel based at least in part on a quantity of identified channels, and transmit the identified channels in the uplink subframe according to the allocated bandwidth and allocated number of symbols for each identified channel.

A non-transitory computer readable medium for wireless communication is described. The non-transitory computer-readable medium may include instructions operable to cause a processor to identify an uplink subframe for communication with a base station, identify channels to be transmitted in the uplink subframe, allocate a bandwidth and a number of symbols for each identified channel based at least in part on a quantity of identified channels, and transmit the identified channels in the uplink subframe according to the allocated bandwidth and allocated number of symbols for each identified channel.

In some examples of the method, apparatus, and non-transitory computer-readable medium described above, transmitting the identified channels comprises: multiplexing at least a portion of the identified channels in the uplink subframe according to a frequency division multiplexing (FDM) scheme, or a time division multiplexing (TDM) scheme, or a code division multiplexing (CDM) scheme, or a space-division multiplexing (SDM) scheme, or a combination thereof.

In some examples of the method, apparatus, and non-transitory computer-readable medium described above, each identified channel comprises one of a PUCCH, or a PUSCH, or an SRS, or a URLCC.

In some examples of the method, apparatus, and non-transitory computer-readable medium described above, at least two channels correspond to different UEs.

In some examples of the method, apparatus, and non-transitory computer-readable medium described above, at least two channels correspond to a single UE.

In some examples of the method, apparatus, and non-transitory computer-readable medium described above, the allocated number of symbols for at least one channel spans the uplink subframe.

In some examples of the method, apparatus, and non-transitory computer-readable medium described above, the allocated number of symbols for at least one channel differs between the uplink subframe and a subsequent uplink subframe.

A method of wireless communication is described. The method may include identifying an uplink subframe and a downlink subframe for communication between a UE and a base station, determining an uplink channel structure for an uplink RS and an uplink data channel to be communicated in the uplink subframe, determining a downlink channel structure for a downlink RS and a downlink data channel to be communicated in the downlink subframe based at least in part on the determined uplink channel structure, and communicating the uplink RS and the uplink data channel according to the uplink channel structure and the downlink RS and the downlink data channel according to the downlink channel structure.

An apparatus for wireless communication is described. The apparatus may include means for identifying an uplink subframe and a downlink subframe for communication between a UE and a base station, means for determining an uplink channel structure for an uplink RS and an uplink data channel to be communicated in the uplink subframe, means for determining a downlink channel structure for a downlink RS and a downlink data channel to be communicated in the downlink subframe based at least in part on the determined uplink channel structure, and means for communicating the uplink RS and the uplink data channel according to the uplink channel structure and the downlink RS and the downlink data channel according to the downlink channel structure.

Another apparatus for wireless communication is described. The apparatus may include a processor, memory in electronic communication with the processor, and instructions stored in the memory. The instructions may be operable to cause the processor to identify an uplink subframe and a downlink subframe for communication between a UE and a base station, determine an uplink channel structure for an uplink RS and an uplink data channel to be communicated in the uplink subframe, determine a downlink channel structure for a downlink RS and a downlink data channel to be communicated in the downlink subframe based at least in part on the determined uplink channel structure, and communicate the uplink RS and the uplink data channel according to the uplink channel structure and the downlink RS and the downlink data channel according to the downlink channel structure.

A non-transitory computer readable medium for wireless communication is described. The non-transitory computer-readable medium may include instructions operable to cause a processor to identify an uplink subframe and a downlink subframe for communication between a UE and a base station, determine an uplink channel structure for an uplink RS and an uplink data channel to be communicated in the uplink subframe, determine a downlink channel structure for a downlink RS and a downlink data channel to be communicated in the downlink subframe based at least in part on the determined uplink channel structure, and communicate the uplink RS and the uplink data channel according to the uplink channel structure and the downlink RS and the downlink data channel according to the downlink channel structure.

In some examples of the method, apparatus, and non-transitory computer-readable medium described above, determining the uplink channel structure comprises: determining an uplink RS waveform for the uplink RS and an uplink data waveform for the uplink data channel. Some examples of the method, apparatus, and non-transitory computer-readable medium described above may further include processes, features, means, or instructions for selecting an uplink RS pattern for the uplink RS and an uplink data pattern for the uplink data channel.

In some examples of the method, apparatus, and non-transitory computer-readable medium described above, determining the downlink channel structure comprises: determining a downlink RS waveform for the downlink RS based at least in part on the uplink RS waveform. Some examples of the method, apparatus, and non-transitory computer-readable medium described above may further include processes, features, means, or instructions for determining a downlink data waveform for the downlink data channel based at least in part on the uplink data waveform.

In some examples of the method, apparatus, and non-transitory computer-readable medium described above, determining the downlink channel structure further comprises: selecting a downlink RS pattern for the downlink RS based at least in part on the uplink RS pattern. Some examples of the method, apparatus, and non-transitory computer-readable medium described above may further include processes, features, means, or instructions for selecting a downlink data pattern for the downlink data channel based at least in part on the downlink RS pattern.

In some examples of the method, apparatus, and non-transitory computer-readable medium described above, determining the downlink channel structure comprises: determining a downlink RS waveform for the downlink RS and a downlink data waveform for the downlink data channel. Some examples of the method, apparatus, and non-transitory computer-readable medium described above may further include processes, features, means, or instructions for selecting a downlink RS pattern for the downlink RS and a downlink data pattern for the downlink data channel.

In some examples of the method, apparatus, and non-transitory computer-readable medium described above, wherein determining the uplink channel structure comprises: determining an uplink RS waveform for the uplink RS based at least in part on the downlink RS waveform. Some examples of the method, apparatus, and non-transitory computer-readable medium described above may further include processes, features, means, or instructions for determining an uplink data waveform for the uplink data channel based at least in part on the downlink data waveform.

In some examples of the method, apparatus, and non-transitory computer-readable medium described above, wherein determining the uplink channel structure further comprises: selecting an uplink RS pattern for the uplink RS based at least in part on the downlink RS pattern. Some examples of the method, apparatus, and non-transitory computer-readable medium described above may further include processes, features, means, or instructions for selecting an uplink data pattern for the uplink data channel based at least in part on the uplink RS pattern.

In some examples of the method, apparatus, and non-transitory computer-readable medium described above, communicating the uplink RS and the downlink RS comprises: multiplexing the uplink RS and the downlink RS according to an SC-FDM scheme or an OFDM scheme.

In some examples of the method, apparatus, and non-transitory computer-readable medium described above, communicating the uplink data channel and the downlink data channel comprises: multiplexing the uplink data channel and the downlink data channel according to an SC-FDM scheme or an OFDM scheme.

In some examples of the method, apparatus, and non-transitory computer-readable medium described above, communicating the uplink RS and the uplink data channel according to the uplink channel structure and the downlink RS and the downlink data channel according to the downlink channel structure comprises: multiplexing the uplink RS, the uplink data channel, the downlink RS, and the downlink data channel according to an SC-FDM scheme or an OFDM scheme.

DETAILED DESCRIPTION

Devices in a wireless communications system, such as an LTE/LTE-A system, may be capable of communicating multiple channels according to different waveforms. For example, a UE or multiple UEs may perform transmission of one or more uplink channels (e.g., a PUSCH, a PUCCH, an SRS, a URLCC) during an uplink subframe. Each uplink channel may be transmitted using a different waveform, such as OFDM waveform or an SC-FDM waveform, among others. To accommodate such transmissions, the channel structure of the uplink subframe may be divided into channel regions, which may vary from one uplink subframe to the next.

Selecting a waveform to use for each channel may be based on the number of channels to be transmitted or the channel type. In some examples, a first waveform may be selected for transmission of RSs, and a second waveform may be selected for transmission of data channels. For example, a DMRS portion of PUSCH may be transmitted by a UE according to an SC-FDM waveform and a data portion of the PUSCH may be transmitted by the UE according to an OFDM waveform.

In some cases, multiple UEs may transmit one or more channels in an uplink subframe and waveform selection may be based on the number of UEs. For example, reference signals for a first UE may be transmitted according to a CDM waveform and data signals for a second UE may be transmitted according to an SDM waveform. Furthermore, the channel structure of a corresponding downlink subframe may be based on the channel structure of the uplink subframe. For example, the channel structures between an uplink subframe and a downlink subframe may be symmetric in that downlink channels and corresponding uplink channels have the same selected waveform and pattern in respective subframes.

Aspects of the disclosure are initially described in the context of a wireless communications system. Aspects of the disclosure are further illustrated by and described with reference to apparatus diagrams, system diagrams, and flowcharts that relate to uplink channel multiplexing and waveform selection.

Figure 1:
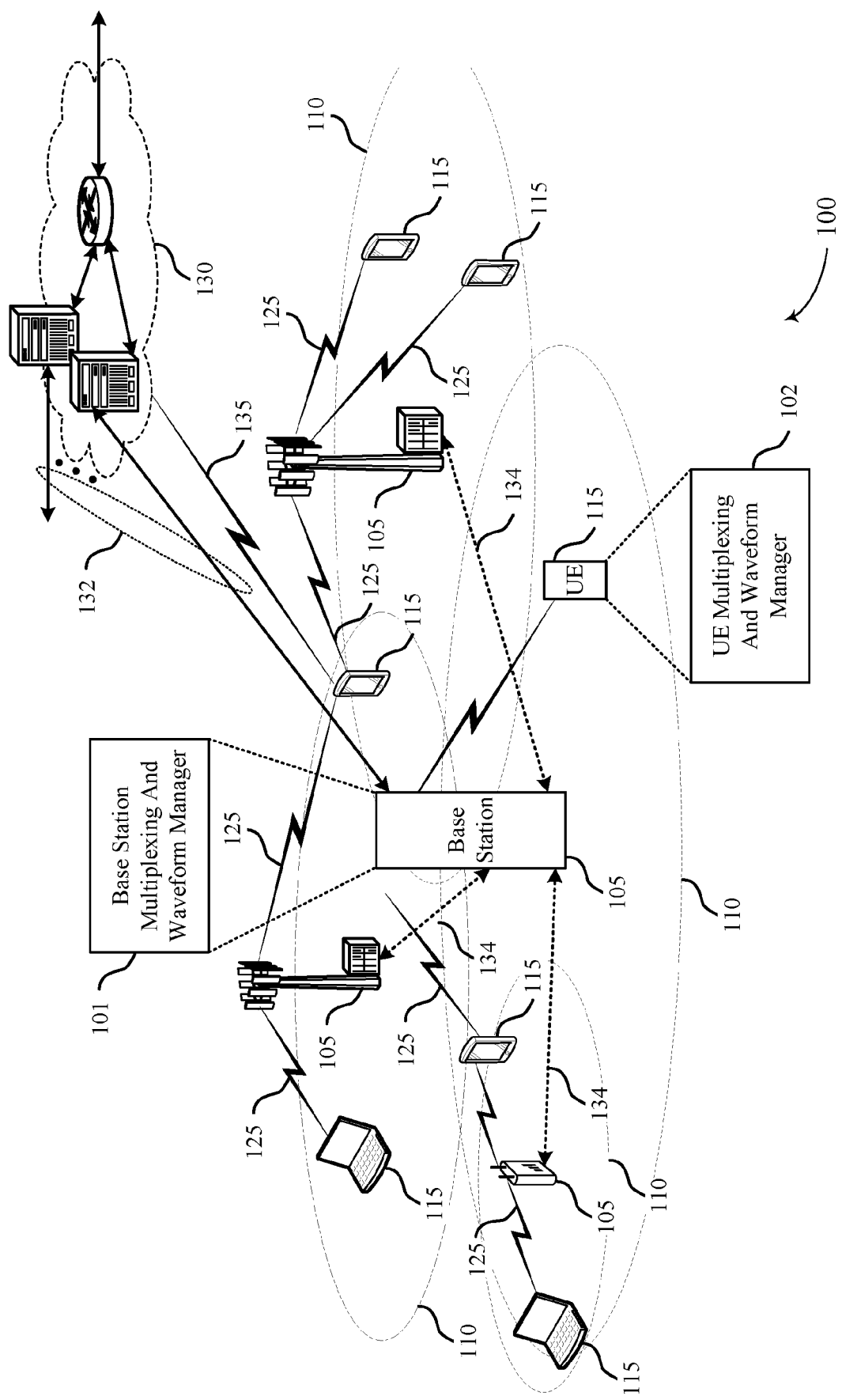
FIG. 1 illustrates an example of a system for wireless communication that supports uplink channel multiplexing and waveform selection in accordance with one or more aspects of the present disclosure.

FIG. 1 illustrates an example of a wireless communications system 100 in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a LTE (or LTE-Advanced) network. Wireless communication system 100 may support uplink channel multiplexing and waveform selection.

The core network 130 may provide user authentication, access authorization, tracking, Internet Protocol (IP) connectivity, and other access, routing, or mobility functions. At least some of the base stations 105 (e.g., eNodeBs (eNBs), network access devices, gNBs) 105-a, gNBs, or access node controllers (ANCs) may interface with the core network 130 through backhaul links 132 (e.g., S1, S2, etc.) and may perform radio configuration and scheduling for communication with the UEs 115. In various examples, the ANCs may communicate, either directly or indirectly (e.g., through core network 130), with each other over backhaul links 134 (e.g., X1, X2, etc.), which may be wired or wireless communication links. Each ANC may additionally or alternatively communicate with a number of UEs 115 through a number of smart radio heads. In an alternative configuration of the wireless communication system 100, the functionality of an ANC may be provided by a radio head or distributed across the radio heads of an eNB.

In some examples, the wireless communication system 100 may include a 5G network. In other examples, the wireless communication system 100 may include a LTE/LTE-A network. The wireless communication system 100 may in some cases be a heterogeneous network, in which different types of eNBs provide coverage for various geographical regions. The term "cell" is a 3GPP term that can be used to describe a base station, a radio head, a carrier or component carrier associated with a base station or a radio head, or a coverage area (e.g., sector, etc.) of a carrier or base station, depending on context.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135. UEs 115 may be dispersed throughout the wireless communications system 100, and each UE 115 may be stationary or mobile.

A UE 115 may additionally or alternatively be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may additionally or alternatively be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

An RS may be a signal known to the receiver, that is inserted into a transmitted signal in order to facilitate channel estimation for coherent de-modulation and measurements. In LTE downlink, cell-specific RSs are provided which are available to all UEs in a cell; UE-specific RSs may be embedded in the data for specific UEs, and Multimedia Broadcast Single Frequency Network (MBSFN)-specific RSs are provided in case of MBSFN operation. These RSs occupy specified Resource Elements (REs) within a symbol of the subframe. In the LTE uplink, demodulation RSs (DM-RS) and SRSs are provided for channel estimation for demodulation and channel sounding respectively.

An SRS may be transmitted by UE 115 using a predetermined sequence (e.g., a Zadoff-Chu sequence) so that a base station 105 may estimate the uplink channel quality. An SRS transmission may not be associated with transmission of data on another channel, and may be transmitted periodically on a wide bandwidth (e.g., a bandwidth including more subcarriers than are allocated for uplink data transmission). In some examples, multiple SRSs from the same or different UEs may span varying bandwidths and number of symbols in an uplink subframe. In some examples, to ensure phase continuity between one or more SRSs, the SRSs from the same UE, are either transmitted within one subframe, or the base station 105 and the UE 115 may maintain one or more continuing phases when switching from uplink transmission to downlink transmission. In some examples, multiple SRSs from the same UEs may be concatenated together to get a wideband SRS at a receiver.

An SRS may additionally or alternatively be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an uplink scheduler. A base station 105 may additionally or alternatively utilize an SRS to check timing alignment status and send time alignment commands to the UE 115.

Data communicated between a UE 115 and a base station 105 may be divided into logical channels, transport channels, and physical layer channels. Channels may additionally or alternatively be classified into Control Channels and Traffic Channels. Logical control channels may include a paging control channel (PCCH) for paging information, a broadcast control channel (BCCH) for broadcast system control information, a multicast control channel (MCCH) for transmitting multimedia broadcast/multicast services (MBMS) scheduling and control information, a dedicated control channel (DCCH) for transmitting dedicated control information, a common control channel (CCCH) for random access information, dedicated traffic channel (DTCH) for dedicated UE data, and a machine type communication channel (MTCH), for multicast data. Downlink transport channels may include a broadcast channel (BCH) for broadcast information, a downlink shared channel (DL-SCH) for data transfer, a paging channel (PCH) for paging information, and a multicast channel (MCH) for multicast transmissions. Uplink transport channels may include random access channel (RACH) for access and an uplink shared channel (UL-SCH) for data.

A base station 105 and a UE 115 may utilize different waveforms based on different multiplexing schemes. For example, OFDM employs multiple overlapping radio frequency carriers, each operating at a chosen frequency that is orthogonal to the other frequencies to produce a transmission scheme that supports higher bit rates due to parallel channel operation. OFDMA is a multiple access scheme relying on the use of OFDM, where individual subcarriers (or groups of subcarriers) are assigned to distinct users. Time division multiplexing (TDM) may include methods of multiplexing different data signals, whereby the channel is divided into multiple time slots and the different signals are mapped to different time slots. Frequency division multiplexing (FDM) may include methods of multiplexing different data signals for transmission on a single communications channel, whereby each signal is assigned a non-overlapping frequency range within the main channel.

SC-FDM uses an additional Fourier transform processing operation (as compared to OFDM) to combine multiple subcarriers into a single SC-FDM symbol. Thus, unlike OFDM, in SC-FDM the signal modulated onto a given subcarrier is a linear combination (for example, via a Discrete Fourier Transform (DFT) precoding operation) of multiple data symbols. In some cases, all the transmitted subcarriers of a single carrier frequency division multiple access (SC-FDMA) signal carry a component of each modulated data symbol. This gives SC-FDMA its single-carrier property, which results in the lower Cubic Metric (CM) and Peak to Average Power Ratio (PAPR).

A PUCCH may be used for uplink acknowledgements (ACKs), scheduling requests (SRs) and channel quality information (CQI) and other uplink control information. A PUCCH may be mapped to a control channel defined by a code and two consecutive resource blocks. Uplink control signaling may depend on the presence of timing synchronization for a cell. PUCCH resources for SR and CQI reporting may be assigned (and revoked) through radio resource control (RRC) signaling. In some cases, resources for SR may be assigned after acquiring synchronization through a RACH procedure. In other cases, an SR may not be assigned to a UE 115 through the RACH (i.e., synchronized UEs may or may not have a dedicated SR channel). PUCCH resources for SR and CQI may be lost when the UE is no longer synchronized. A PUSCH may be the LTE uplink physical channel carrying scheduled data traffic, and control signaling if some is required to be transmitted in the same subframe.

In wireless communications system 100, a UE 115 may communicate with a base station using subframes spanning a given time interval (e.g., 1 ms). The UE 115 may receive packets from a base station 105 over a downlink subframe and transmit packets to a base station 105 over an uplink subframe. A downlink subframe may span an available bandwidth and have symbols allocated for a physical downlink control channel (PDCCH), a physical downlink shared channel (PDSCH), a guard period (GP), and a common burst. An uplink subframe may span the available bandwidth and have symbols allocated for a PDCCH, an uplink burst, a GP, and a common burst. The uplink common burst and uplink burst may include an SRS, a PUCCH, or a PUSCH and the GP may be used when switching from downlink to uplink during a subframe.

In some cases, a UE may transmit an uplink channel such as a PUSCH, a PUCCH, an SRS, or a URLCC to a base station 105 over a single uplink subframe. In other examples, multiple UEs may be capable of transmitting different uplink channels over the same uplink subframe. Different channels may be transmitted according to different waveforms a SC-FDM waveform, an OFDM waveform, or the like. Different channels can additionally or alternatively be multiplexed with different multiplexing techniques such as FDM, TDM, CDM, and SDM, etc.

A base station 105 may include a base station multiplexing and waveform manager 101, which is used to select different waveforms for different channels or for different UEs 115 for uplink transmission. The base station multiplexing and waveform manager 101 may also be used to multiplex multiple UEs 115 in a single uplink subframe and in some instances, the channel structure of the uplink subframe may be symmetric with a downlink subframe.

A UE 115 may include a UE multiplexing and waveform manager 102, which is used to select different waveforms for different channels for uplink transmission. Each of multiple UEs 115 may have an associated UE multiplexing and waveform manager 102 used when multiple UEs 115 are multiplexed in a single uplink subframe. In some instances, the UE multiplexing and waveform manager 102 may be used to manage the channel structure of an uplink subframe, which may be symmetric with a downlink subframe.

Figure 2:
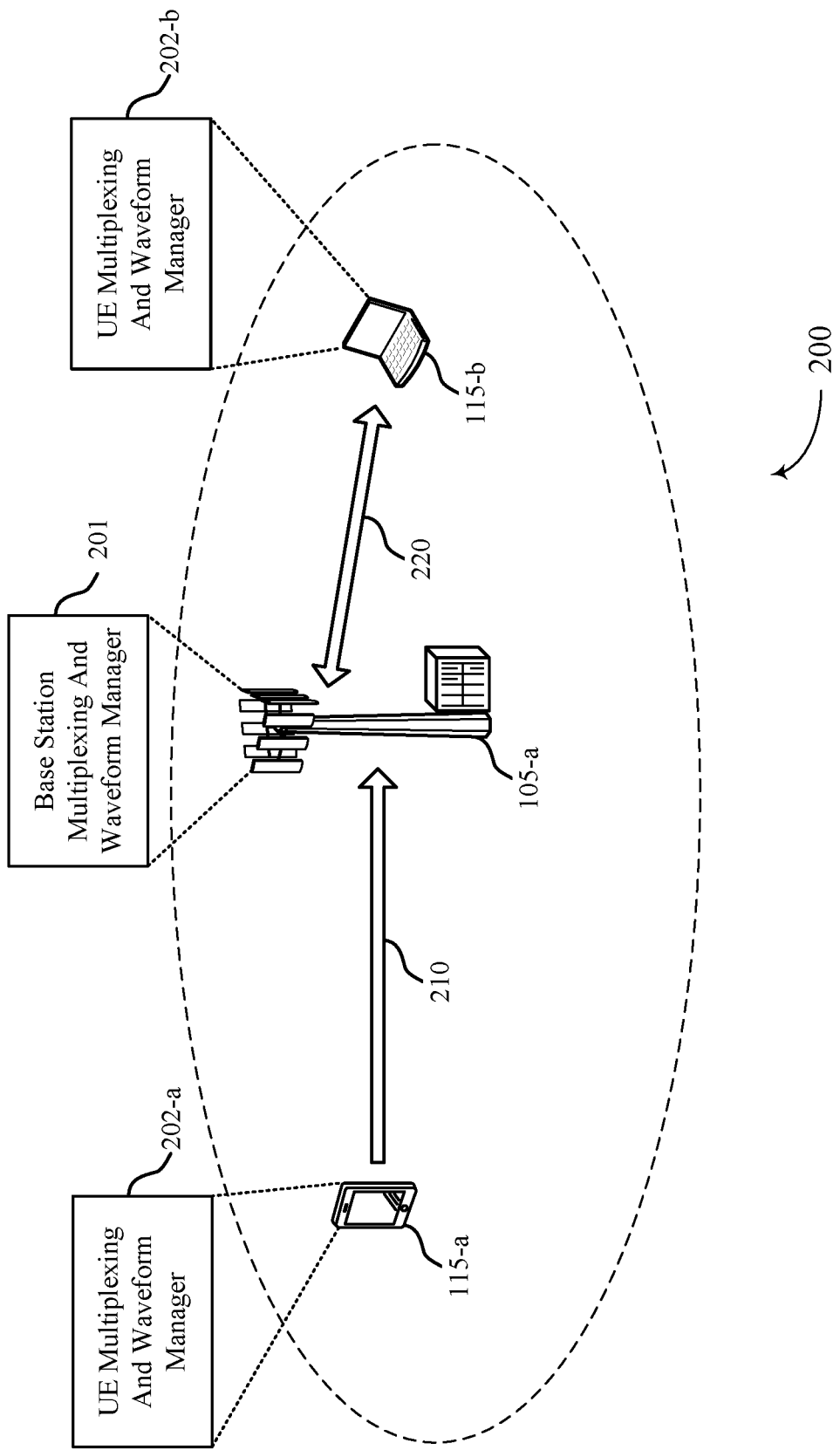
FIG. 2 illustrates an example of a system for wireless communication that supports uplink channel multiplexing and waveform selection in accordance with one or more aspects of the present disclosure.

FIG. 2 illustrates an example of a wireless communications system 200 for uplink channel multiplexing and waveform selection in accordance with one or more aspects of the present disclosure. Wireless communications system 200 includes a base station 105-a in communication with UE 115-a and UE 115-b. As shown, UE 115-a is capable of transmitting uplink packets to base station 105-a over communication link 210. The uplink packets may include data and RSs transmitted according to different waveforms (e.g., OFDM, SC-FDM) and different multiplexing techniques (e.g., CDM, SDM) using UE multiplexing and waveform manager 202-a. The UE multiplexing and waveform manager 202-a may be used to select a waveform for a given channel for uplink transmission. For example, the UE 115-a may transmit both data and RSs according to the same waveform or may transmit data and RSs using different waveforms. Waveform selection may be based on link-budget associated with the UE 115-a, overhead limitations, the number of UEs 115 in the wireless communications system 200, among other factors. In some cases, waveform selection may be based on an RS/data ratio of the uplink channel structure transmitted over communication link 210.

As shown, base station 105-a is also in communication with UE 115-b. Using communication link 220, base station 105-a may transmit downlink packets to UE 115-b and UE 115-b may transmit uplink packets to base station 105-a. UE 115-b may include a UE multiplexing and waveform manager 202-b used to select waveforms for communication of data. In some examples, UE multiplexing and waveform manager 202-b, e.g., in conjunction with base station multiplexing and waveform manager 201, may be used to provide symmetry between an uplink channel and a downlink channel over communication link 220. For example, RSs may be communicated between UE 115-b and base station 105-a according to the same waveform and data may be communicated between UE 115-b and base station 105-a according to the same waveform, which may be a different waveform than that which is used to communicate the RSs. Additionally or alternatively, in some cases, RSs and data may have the same pattern in the uplink subframe as in the downlink subframe. For instance, RSs may span the same bandwidth and number of symbols in each of the uplink and downlink subframes, while data may be communicated in the uplink and downlink subframes over the same bandwidth and number of symbols.

The base station 105-a may receive uplink packets from UE 115-a or UE 115-b using base station multiplexing and waveform manager 201. Base station multiplexing and waveform manager 201 may also be used to multiplex different channels for different UEs 115 in the same uplink subframe. Additionally, the base station multiplexing and waveform manager 201 may be used to provide symmetry between uplink subframes and downlink subframes used for communication between base station 105-a and UEs 115-a and 115-b.

Figure 3A:
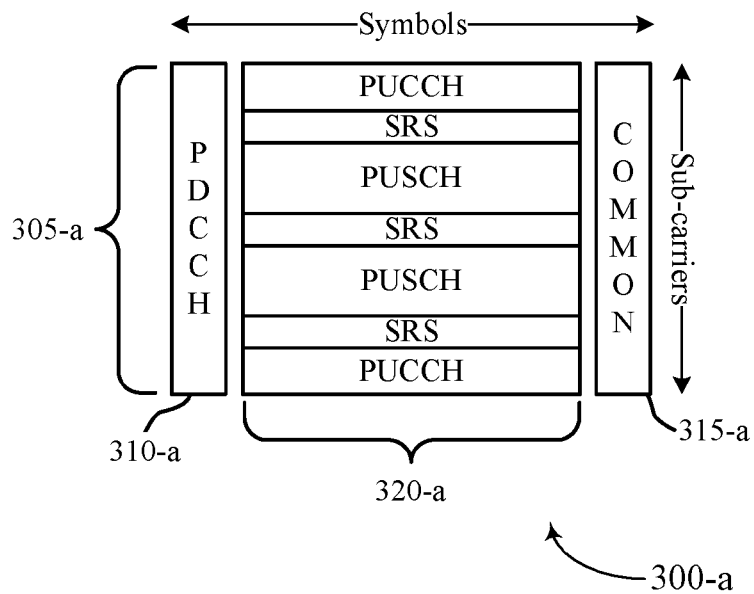
FIGS. 3A and 3B illustrate example channel structures that support uplink channel multiplexing and waveform selection in accordance with one or more aspects of the present disclosure.

FIG. 3A illustrates an example of a channel structure 300-a for uplink channel multiplexing and waveform selection in accordance with one or more aspects of the present disclosure. As shown, channel structure 300-a is representative of an uplink subframe spanning a number of symbols in time and a number of sub-carriers in frequency. The number of sub-carriers span an available bandwidth 305-a. A portion of the number of symbols is allocated for a PDCCH 310-a and a portion of the number of symbols is additionally or alternatively allocated for a common uplink burst 315-a. The remainder of the number of symbols is allocated for uplink burst 320-a over which a number of channels for a UE may be transmitted. As shown in this example, bandwidth 305-a is divided into a number of different channel regions in the uplink burst 320-a, which includes multiple PUCCH, PUSCH, and SRS channels spanning the entire number of symbols allocated for the uplink burst 320-a. In some examples, multiple SRSs from the same UE may be concatenated together to get a wideband SRS at a receiver. Here, FDM is used to divide each of the channels. In other words, each channel spans a given number of sub-carriers of the bandwidth 305-a. In some examples, different waveforms may be selected for the multiple channels. For example, SC-FDM may be selected for one or more of the SRSs and OFDM may be selected for one or more of the PUSCHs. The multiple channels are additionally or alternatively shown in a given pattern spanning the bandwidth 305-a and each channel is disjoint from the other channels in frequency. Though one pattern of channels is shown, any number of channels in any pattern may be considered without departing from the scope of the present disclosure.

Figure 3B:
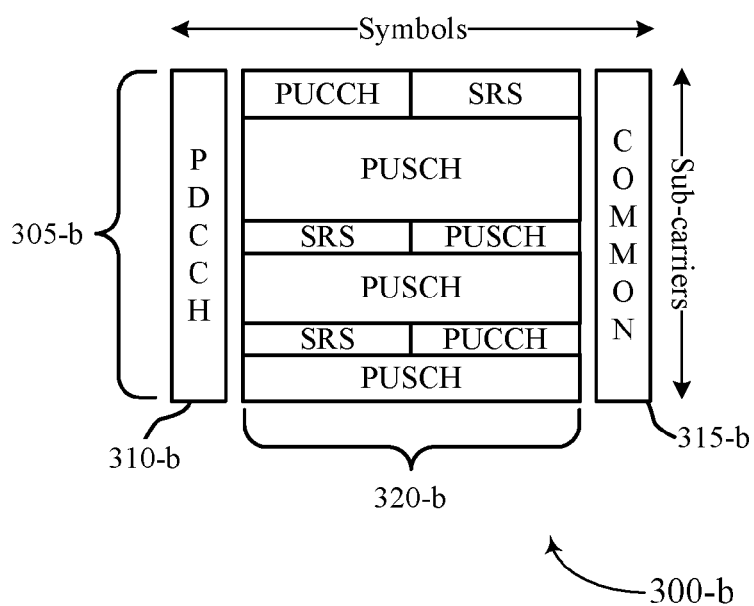

FIG. 3B illustrates an example of a channel structure 300-b for uplink channel multiplexing and waveform selection in accordance with one or more aspects of the present disclosure. As shown, channel structure 300-b is representative of an uplink subframe spanning a number of symbols in time and a number of sub-carriers in frequency. The number of sub-carriers span an available bandwidth 305-b. As in FIG. 3A, a portion of the number of symbols is allocated for a PDCCH 310-b and a portion of the number of symbols is additionally or alternatively allocated for a common uplink burst 315-b. The remainder of the number of symbols is allocated for uplink burst 320-b over which a number of channels for a UE may be transmitted. As shown in this example, bandwidth 305-b is divided into a number of different channel regions in the uplink burst 320-b, which includes multiple PUCCH, PUSCH, and SRS channels spanning the entire number of symbols allocated for the uplink burst 320-b. Here, FDM and TDM is used to divide each of the channels. In other words, each channel spans a given number of sub-carriers of the bandwidth 305-a and may additionally or alternatively span a portion of the symbols allocated for the uplink burst 320-b. In some examples, different waveforms may be selected for the multiple channels. For example, SC-FDM may be selected for one or more of the SRSs and OFDM may be selected for one or more of the PUSCHs. The multiple channels are additionally or alternatively shown in a given pattern spanning the bandwidth 305-a and each channel is disjoint from the other channels in frequency, while some channels are also disjointed in time. For example, an SRS and a PUSCH both span the same sub-carriers but different symbols in time. Though one pattern of channels is shown in this FDM and TDM division, any number of channels in any pattern may be considered without departing from the scope of the present disclosure.

Figure 4A:
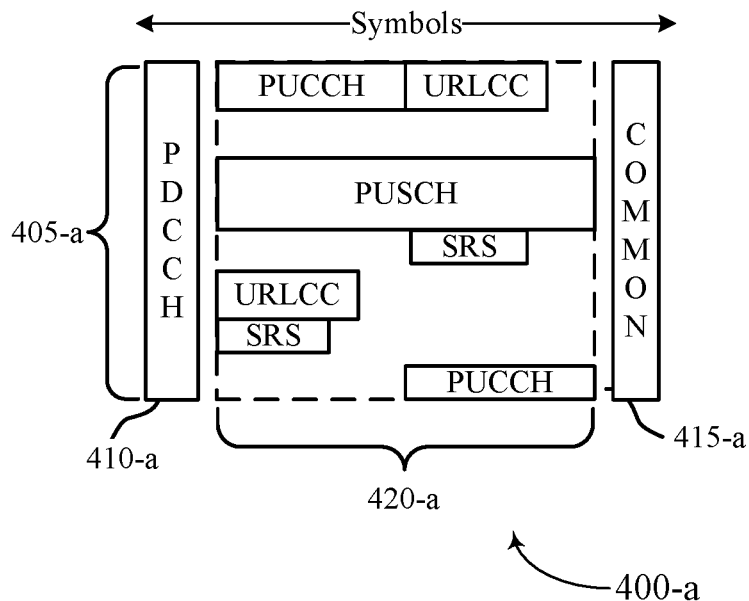
FIGS. 4A through 4D illustrate example channel structures that support uplink channel multiplexing and waveform selection in accordance with one or more aspects of the present disclosure.

FIG. 4A illustrates an example of a channel structure 400-*a* for uplink channel multiplexing and waveform selection in accordance with one or more aspects of the present disclosure. As shown, channel structure 400-*a* is representative of an uplink subframe spanning a number of symbols in time and a number of sub-carriers in frequency. The number of sub-carriers span an available bandwidth 405-*a*. A portion of the number of symbols is allocated for a PDCCH 410-*a* and a portion of the number of symbols is also allocated for a common uplink burst 415-*a*. The remainder of the number of symbols is allocated for uplink burst 420-*a* over which a number of channels for a UE may be transmitted. For example, multiple channels including a PUCCH, a PUSCH, a URLCC, and a SRS may span varying sub-carriers and symbols in the uplink burst 420-*a*. In some examples, different waveforms may be selected for the multiple channels. For example, SC-FDM may be selected for one or more of the SRSs and OFDM may be selected for one or more of the PUSCHs. Additionally or alternatively, a channel may span different sub-carriers or a different number of symbols in different subframes. For example, a channel, such as a PUCCH, may span more or fewer symbols in a subsequent subframe or may span more or fewer sub-carriers in the subsequent subframe. In addition to varying numbers of symbols or sub-carriers, the channel may also span different sub-carriers or different symbols in the subsequent subframe.

Figure 4B:
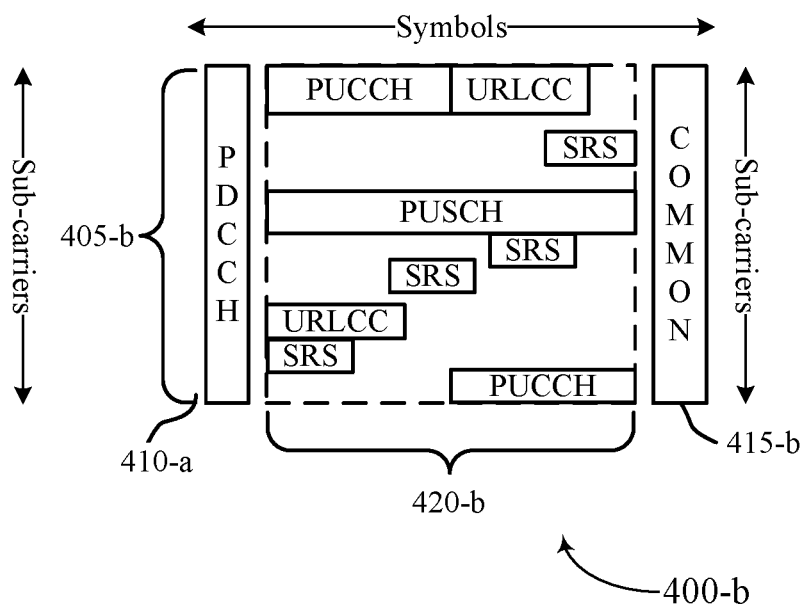

FIG. 4B illustrates an example of a channel structure 400-*b* for uplink channel multiplexing and waveform selection in accordance with one or more aspects of the present disclosure. As shown, channel structure 400-*b* is representative of an uplink subframe spanning a number of symbols in time and a number of sub-carriers in frequency. The number of sub-carriers span an available bandwidth 405-*b*. A portion of the number of symbols is allocated for a PDCCH 410-*b* and a portion of the number of symbols is also allocated for a common uplink burst 415-*b*. The remainder of the number of symbols is allocated for uplink burst 420-*b* over which a number of channels for a UE may be transmitted. As shown in this example, multiple channels including a PUCCH, a PUSCH, a URLCC, and an SRS span varying sub-carriers and symbols in the uplink burst 420-*b*. In some examples, different waveforms may be selected for the multiple channels. For example, SC-FDM may be selected for one or more of the SRSs in such a manner that the SRSs cover different bandwidths at different symbols. OFDM may be selected for one or more of the PUSCHs. Additionally or alternatively, a channel may span different sub-carriers or a different number of symbols in different subframes. For example, a channel, such as a PUCCH, may span more or fewer symbols in a subsequent subframe or may span more or fewer sub-carriers in the subsequent subframe. In addition to varying numbers of symbols or sub-carriers, the channel may also span different sub-carriers or different symbols in the subsequent subframe.

In some examples, each channel may be from the same UE, but according to this pattern, some symbols and sub-carriers within the uplink burst 420-*a* and the uplink burst 420-*b* may be unused. Accordingly, in other examples, multiple channels from different UEs may be multiplexed in a single uplink burst.

Figure 4C:
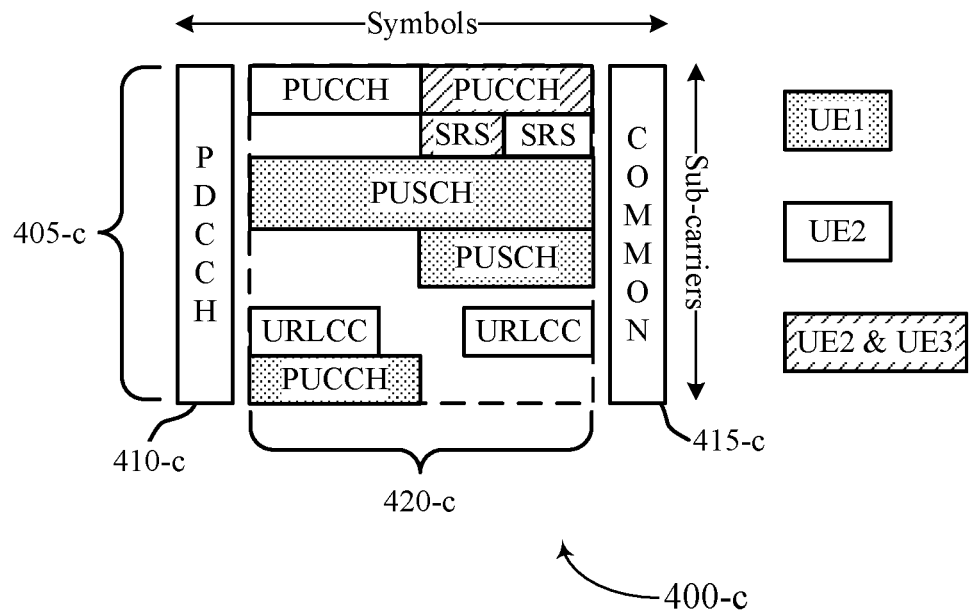

FIG. 4C illustrates an example of a channel structure 400-*b* for uplink channel multiplexing and waveform selection in accordance with one or more aspects of the present disclosure. As shown, channel structure 400-*c* is representative of an uplink subframe spanning a number of symbols in time and a number of sub-carriers in frequency. The number of sub-carriers span an available bandwidth 405-*c*. As in FIGS. 4A and 4B, a portion of the number of symbols is allocated for a PDCCH 410-*c* and a portion of the number of symbols is also allocated for a common uplink burst 415-*c*. The remainder of the number of symbols is allocated for uplink burst 420-*c* over which a number of channels for multiple UEs may be transmitted. In some examples, multiple PUCCH, PUSCH, URLCC, and SRS channels may span varying bandwidths and symbols. Additionally or alternatively, multiple channels for multiple UEs (e.g., UE1, UE2, and UE3) are multiplexed within the uplink burst 420-*c*. Further, as shown, multiple UEs may be multiplexed in the same number of symbols and span the same sub-carriers. For example, channels such as a PUCCH and an SRS for UE2 and UE3 may be multiplexed in the same number of symbols and span the same sub-carriers, as shown in FIG. 4C. The channels for each of UE2 and UE3 may be multiplexed according to a TDM scheme, a CDM scheme, an SDM scheme, etc. In some examples, different waveforms may be selected for multiple channels or for different UEs. For example, SC-FDM may be selected for UE1 PUCCH, OFDM may be selected for UE2 URLCC, and OFDM may be selected for UE3 SRS.

Figure 4D:
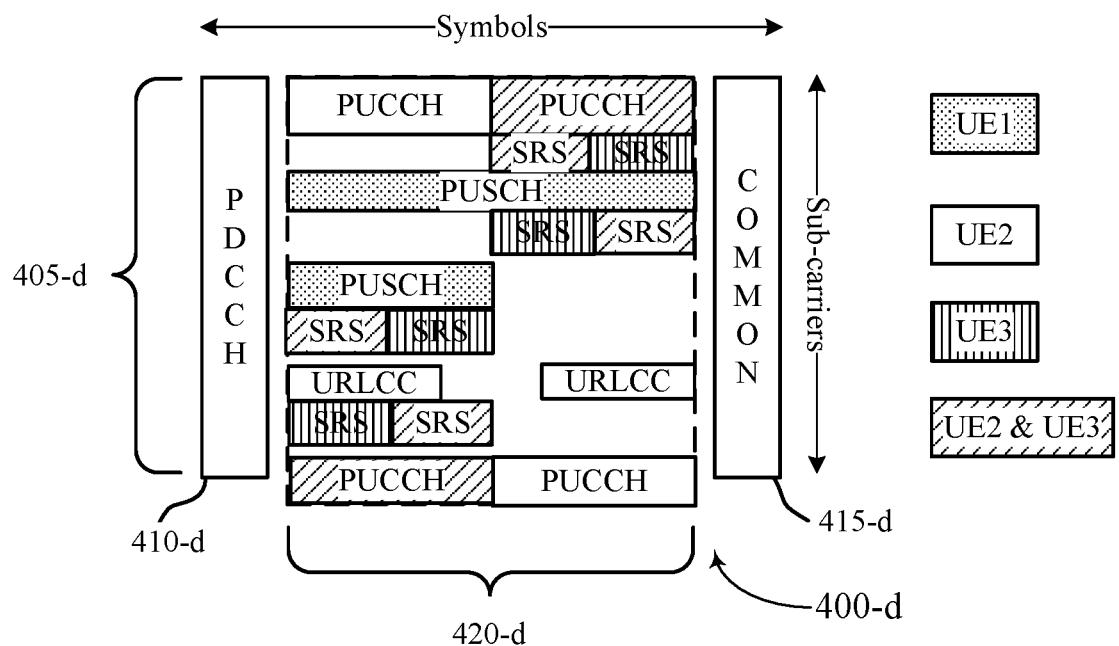

FIG. 4D illustrates an example of a channel structure 400-*d* for uplink channel multiplexing and waveform selection in accordance with one or more aspects of the present disclosure. In some examples, channel structure 400-*d* may be representative of an uplink subframe spanning a number of symbols in time and a number of sub-carriers in frequency. The number of sub-carriers span an available bandwidth 405-*d*. As in FIGS. 4A, 4B and 4C, a portion of the number of symbols is allocated for a PDCCH 410-*d* and a portion of the number of symbols is also allocated for a common uplink burst 415-*d*. The remainder of the number of symbols is allocated for uplink burst 420-*d* over which a number of channels for multiple UEs may be transmitted. As shown in this example, multiple PUCCH, PUSCH, URLCC, and SRS channels span varying bandwidths and symbols. Additionally or alternatively, multiple channels for multiple UEs (UE1, UE2, and UE3) are multiplexed within the uplink burst 420-*d*. Further, as shown, multiple UEs may be multiplexed in the same number of symbols and span the same sub-carriers. For example, channels such as a PUCCH and an SRS for UE2 and UE3 may be multiplexed in the same number of symbols and span the same sub-carriers, as shown in FIG. 4D. The channels for each of UE2 and UE3 may be multiplexed according to a TDM scheme, a CDM scheme, an SDM scheme, etc. In some examples, different waveforms may be selected for multiple channels or for different UEs. For example, SC-FDM may be selected for UE1 PUCCH, OFDM may be selected for UE2 URLCC, and OFDM may be selected for UE3 SRS.

The multiple channels are additionally or alternatively shown in a given pattern over the bandwidth 405-*c* and bandwidth 405-*d* and each channel spans varying subcarriers in frequency and symbols in time. Though one pattern of channels is shown, any number of channels in any pattern may be considered without departing from the scope of the present disclosure.

Figure 5A:
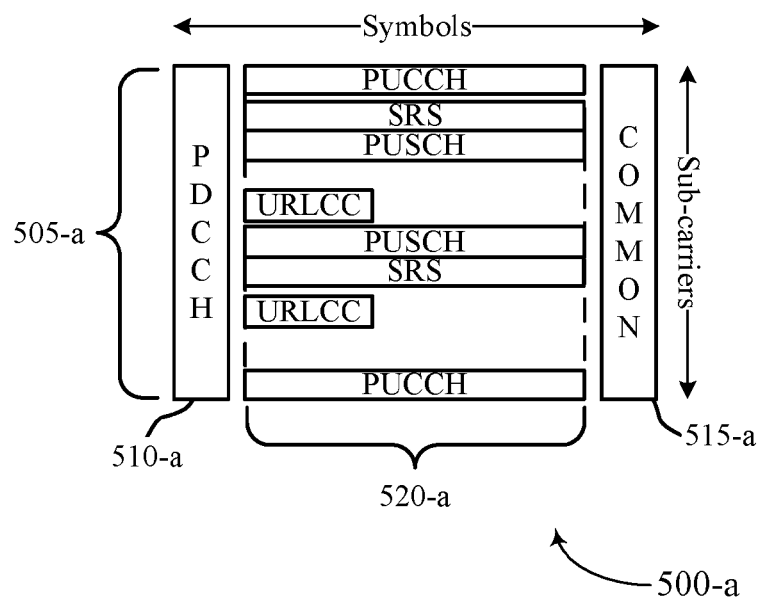
FIGS. 5A and 5B illustrate example channel structures that support uplink channel multiplexing and waveform selection in accordance with one or more aspects of the present disclosure.

FIG. 5A illustrates an example of a channel structure 500-*a* for uplink channel multiplexing and waveform selection in accordance with one or more aspects of the present disclosure. As shown, channel structure 500-*a* is representative of an uplink subframe spanning a number of symbols in time and a number of sub-carriers in frequency. The number of sub-carriers span an available bandwidth 505-*a*. A portion of the number of symbols is allocated for a PDCCH 510-*a* and a portion of the number of symbols is also allocated for a common uplink burst 515-*a*. The remainder of the number of symbols is allocated for uplink burst 520-*a* over which a number of channels for a UE may be transmitted. As shown in this example, multiple channels including a PUCCH, a PUSCH, a URLCC, and an SRS span varying sub-carriers and symbols in the uplink burst 520-*a*. Each channel spans disjoint sub-carriers in that the same channel type (e.g., SRS) spans multiple bandwidths. In some examples, different waveforms may be selected for the multiple channels. For example, SC-FDM may be selected for the URLCC and OFDM may be selected for the PUCCH. The multiple channels are also shown in a given pattern over the bandwidth 405-*b* and each channel spans varying sub-carriers in frequency and symbols in time. Though one pattern of channels is shown, any number of channels in any pattern may be considered without departing from the scope of the present disclosure.

Figure 5B:
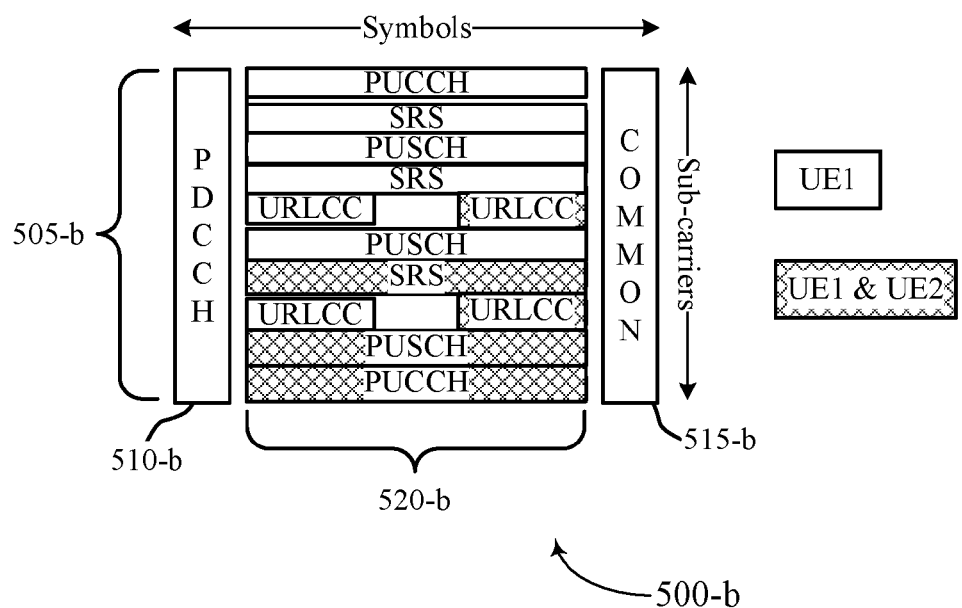

In FIG. 5A, each channel is from the same UE, however, according to this pattern, some symbols and sub-carriers within the uplink burst 520-*a* are unused. Accordingly, as shown in FIG. 5B, multiple UEs may be multiplexed in a single uplink burst 520-*b*. FIG. 5B illustrates an example of a channel structure 500-*b* for uplink channel multiplexing and waveform selection in accordance with one or more aspects of the present disclosure. As shown, channel structure 500-*b* is representative of an uplink subframe spanning a number of symbols in time and a number of sub-carriers in frequency. The number of sub-carriers span an available bandwidth 505-*b*. As in FIG. 5A, a portion of the number of symbols is allocated for a PDCCH 510-*b* and a portion of the number of symbols is also allocated for a common uplink burst 515-*b*. The remainder of the number of symbols is allocated for uplink burst 520-*b* over which a number of channels for multiple UEs may be transmitted. As shown in this example, multiple PUCCH, PUSCH, URLCC, and SRS channels span varying bandwidths and symbols. Additionally or alternatively, multiple channels for multiple UEs (UE1 and UE2) are multiplexed within the uplink burst 520-*b*. Also as shown, multiple UEs may be multiplexed in the same number of symbols and span the same sub-carriers. For example, channels such as a PUCCH, URLCC, SRS, and PUSCH for UE1 and UE2 are multiplexed in the same number of symbols and span the same sub-carriers. The channels for UE1 and UE2 may be multiplexed according to a TDM scheme, a CDM scheme, an SDM scheme, etc. Some channels, may additionally or alternatively be disjoint in that the same channel type (e.g., URLCC) spans multiple bandwidths and multiple UEs (e.g., UE1 and UE2) are multiplexed in the same symbols and same sub-carriers. In some examples, different waveforms may be selected for multiple channels or for different UEs. For example, SC-FDM may be selected for UE1 PUCCH and CDM may be selected for UE2 URLCC.

The multiple channels are also shown in a given pattern over the bandwidth 505-*b* and each channel spans varying subcarriers in frequency and symbols in time. Though one pattern of channels is shown, any number of channels in any pattern may be considered without departing from the scope of the present disclosure.

Figure 6A:
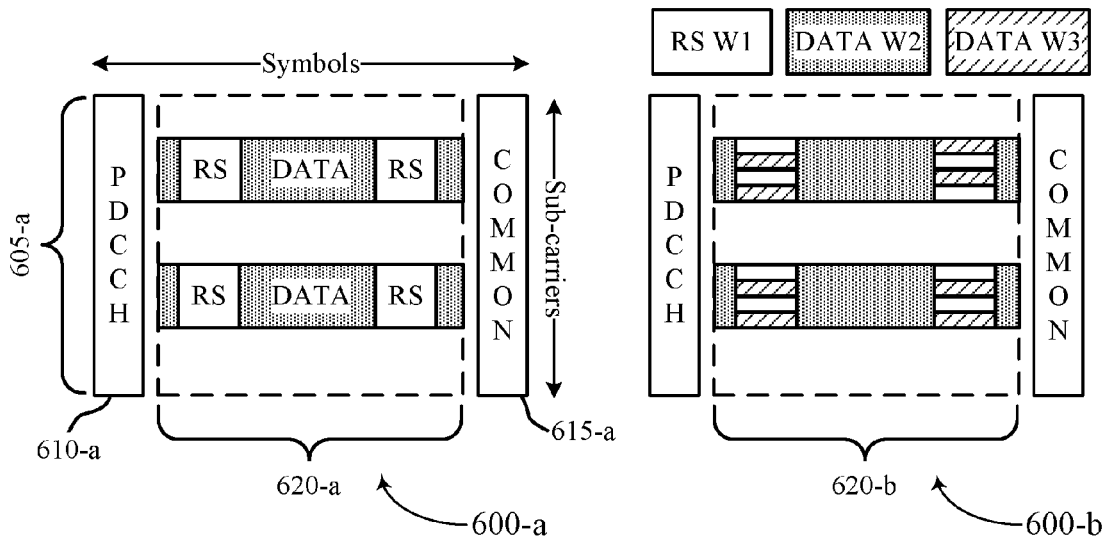
FIGS. 6A and 6B illustrate example channel structures that support uplink channel multiplexing and waveform selection in accordance with one or more aspects of the present disclosure.

FIG. 6A illustrates example channel structures 600 for uplink channel multiplexing and waveform selection in accordance with one or more aspects of the present disclosure. As shown, channel structure 600-*a* is representative of an uplink subframe spanning a number of symbols in time and a number of sub-carriers in frequency. The number of sub-carriers span an available bandwidth 605-*a*. A portion of the number of symbols is allocated for a PDCCH 610-*a* and a portion of the number of symbols is also allocated for a common uplink burst 615-*a*. The remainder of the number of symbols is allocated for uplink burst 620-*a* over which a number of channels for a UE or multiple UEs may be transmitted. As shown in this example, data channels and RSs span varying sub-carriers and symbols in the uplink burst 620-*a*. In some examples, different waveforms may be selected for the multiple channels. For example, SC-FDM may be selected for the RSs and OFDM may be selected for the data channels. In other examples, the same waveform may be used for both data channels and RSs.

As shown in channel structure 600-*b*, data channels and RSs span varying sub-carriers and symbols in the uplink burst 620-*b*. In this example, waveform 1 (W1) was selected for transmitting RSs, waveform 2 (W2) was selected for transmitting some data, and waveform 3 (W3) was also selected for transmitting data. For example, OFDM may be selected for W1, SC-FDM may be selected for W2, and OFDM may be selected for W3. In this case, RSs may be transmitted according to OFDM, while data may be transmitted according to OFDM or SC-FDM. In other examples, different waveforms may be selected for W1, W2, and W3, and the same waveform may be used for W1, W2, and W3.

The multiple channels are also shown in a given pattern over the bandwidth 605-*b* and each channel spans varying subcarriers in frequency and symbols in time. Though one pattern of channels is shown, any number of channels in any pattern may be considered without departing from the scope of the present disclosure.

Figure 6B:
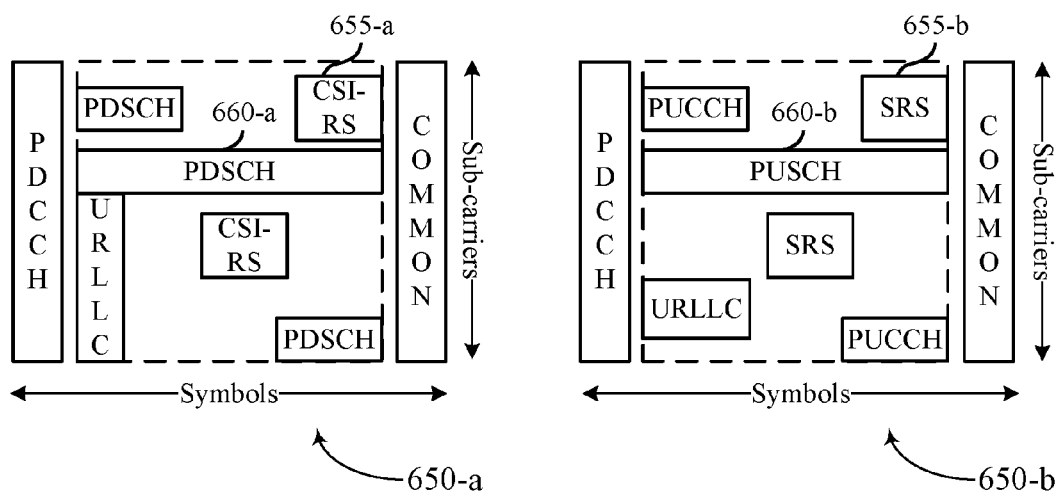

FIG. 6B illustrates an example of a downlink channel structure 650-*a* and an uplink channel structure 650-*b* in accordance with one or more aspects of the present disclosure.

As shown, downlink channel structure 650-*a* and uplink channel structure 650-*b* span a number of symbols in time and a number of sub-carriers in frequency. A portion of the number of symbols is allocated for and a portion of the number of symbols is also allocated for a common uplink burst. As shown in this example, multiple downlink channels and uplink channels are shown in respective channel structures 650 and downlink channel structure 650-*a* is symmetric with uplink channel structure 650-*b*. Different waveforms may be selected for multiple channels or for different UEs, which may be same between downlink channel structure 650-*a* is symmetric with uplink channel structure 650-*b*. For example, CSI-RS 655-*a* in downlink channel structure 650-*a* may be associated with a SC-FDM waveform and SRS 655-*b* may also be associated with a SC-FDM waveform. Additionally or alternatively, PDSCH 660-*a* may be associated with an OFDM waveform, and PUSCH 660-*b* may additionally or alternatively be associated with an OFDM waveform.

The channels are also shown in the same or similar pattern in each of the channel structures 650. For example, although different channels span varying subcarriers in frequency and symbols in time, corresponding RS or other channels span relatively the same subcarriers and number of symbols. Though one pattern of channels is shown for each of the downlink channel structure 650-*a* is symmetric with uplink channel structure 650-*b*, any number of channels in any pattern may be considered without departing from the scope of the present disclosure.

Figure 7:
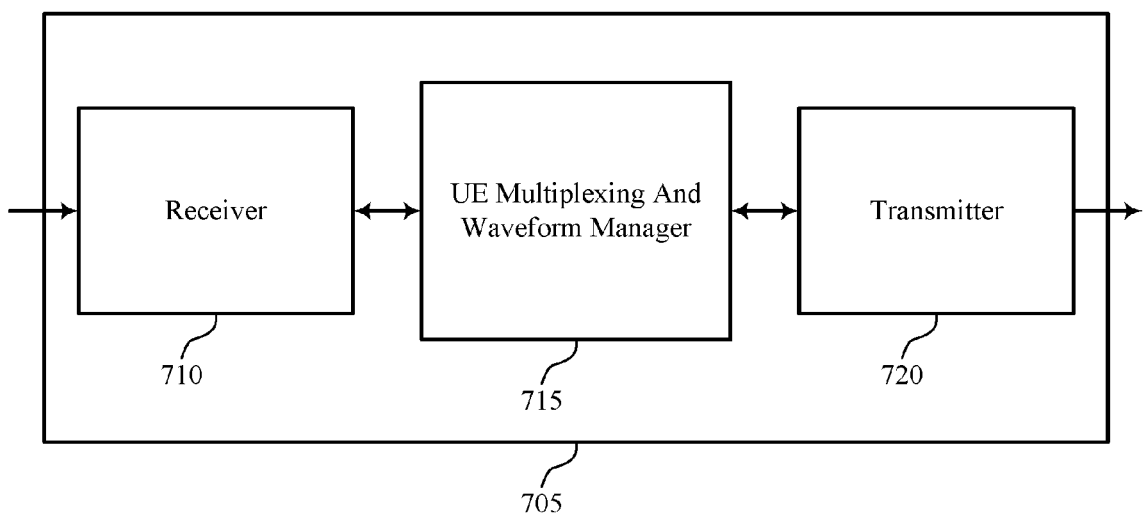
FIGS. 7 through 9 show block diagrams of a device that supports uplink channel multiplexing and waveform selection in accordance with one or more aspects of the present disclosure.

FIG. 7 shows a block diagram 700 of a wireless device 705 that supports uplink channel multiplexing and waveform selection in accordance with one or more aspects of the present disclosure. Wireless device 705 may be an example of aspects of a UE 115 as described with reference to FIG. 1. Wireless device 705 may include receiver 710, UE multiplexing and waveform manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink channel multiplexing and waveform selection, etc.). Information may be passed on to other components of the device. The receiver 710 may be an example of aspects of the transceiver 1035 described with reference to FIG. 10.

UE multiplexing and waveform manager 715 may be an example of aspects of the UE multiplexing and waveform manager 1015 described with reference to FIG. 10. UE multiplexing and waveform manager 715 may identify an uplink subframe for communication with a base station, select a first waveform for a transmission of data in the uplink subframe, and select a second waveform for transmission of an RS in the uplink subframe. The UE multiplexing and waveform manager 715 may also identify an uplink subframe for communication with a base station, identify channels to be transmitted in the uplink subframe, and allocate a bandwidth and a number of symbols for each identified channel based on a quantity of identified channels.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
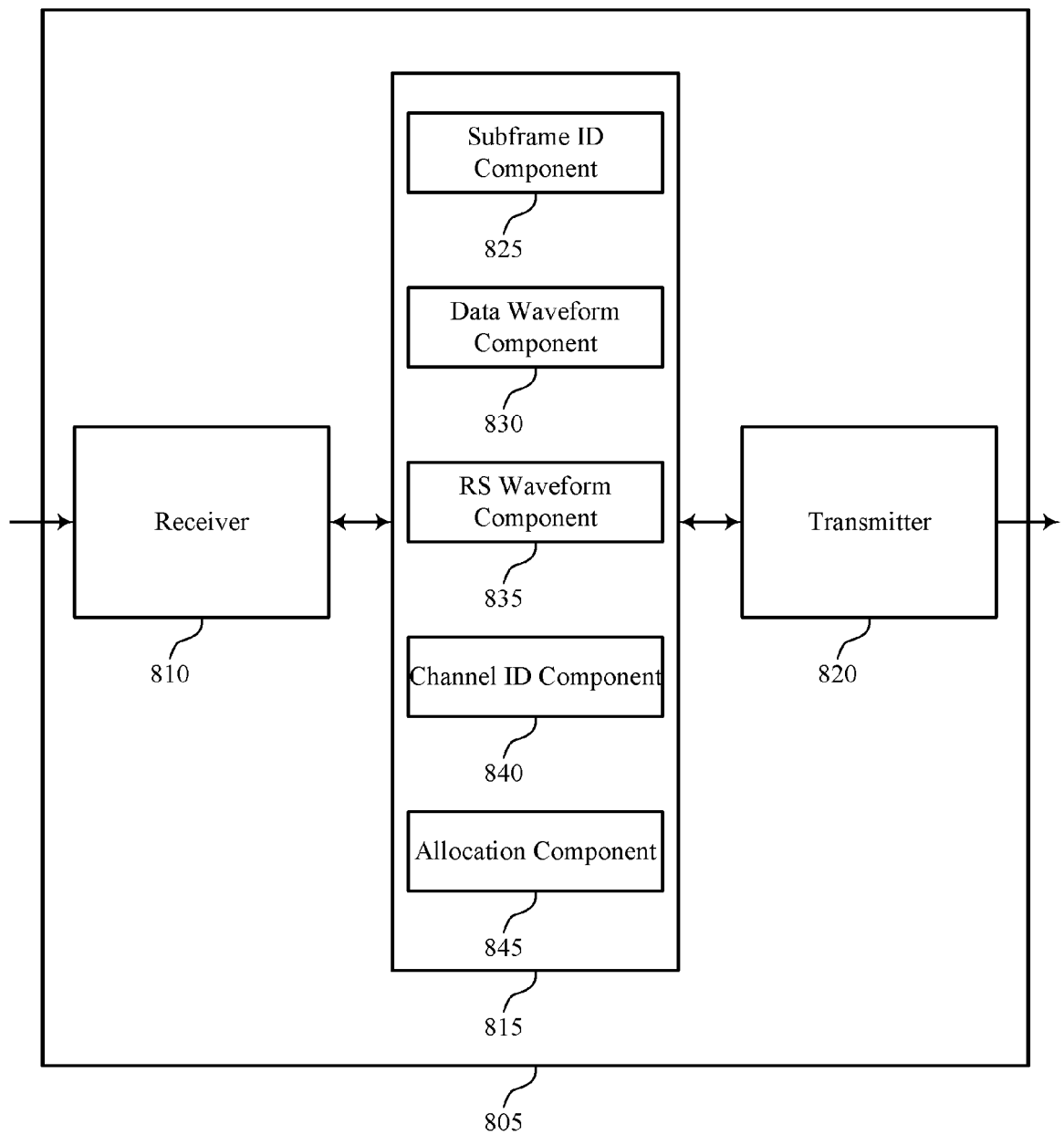

FIG. 8 shows a block diagram 800 of a wireless device 805 that supports uplink channel multiplexing and waveform selection in accordance with one or more aspects of the present disclosure. Wireless device 805 may be an example of aspects of a wireless device 705 or a UE 115 as described with reference to FIGS. 1 and 7. Wireless device 805 may include receiver 810, UE multiplexing and waveform manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to uplink channel multiplexing and waveform selection, etc.). Information may be passed on to other components of the device. The receiver 810 may be an example of aspects of the transceiver 1035 described with reference to FIG. 10.

UE multiplexing and waveform manager 815 may be an example of aspects of the UE multiplexing and waveform manager 1015 described with reference to FIG. 10. UE multiplexing and waveform manager 815 may also include subframe ID component 825, data waveform component 830, RS waveform component 835, channel ID component 840, and allocation component 845.

Subframe ID component 825 may identify an uplink subframe for communication with a base station and identify an additional uplink subframe for communication with the base station.

Data waveform component 830 may select a first waveform for a transmission of data in the uplink subframe. In some cases, the first waveform includes a SC-FDM waveform or an OFDM waveform.

RS waveform component 835 may select a second waveform for transmission of an RS in the uplink subframe. In some cases, the second waveform includes a SC-FDM waveform or an OFDM waveform.

Channel ID component 840 may identify channels to be transmitted in the uplink subframe. In some cases, each identified channel includes one of a PUCCH, or a PUSCH, or an SRS, or a URLCC. In some cases, at least two channels correspond to different UEs. In some cases, at least two channels correspond to a single UE.

Allocation component 845 may allocate a bandwidth and a number of symbols for each identified channel based on a quantity of identified channels. In some cases, the allocated number of symbols for at least one channel spans the uplink subframe. In some cases, the allocated number of symbols for at least one channel differs between the uplink subframe and a subsequent uplink subframe.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas. Transmitter 820 may further transmit the data and the RS in the uplink subframe, the data transmitted according to the selected first waveform and the RS transmitted according to the selected second waveform, transmit the data in the additional uplink subframe according to the selected third waveform, transmit the additional RS in the additional uplink subframe according to the selected third waveform, and transmit the identified channels in the uplink subframe according to the allocated bandwidth and allocated number of symbols for each identified channel. In some cases, transmitting the data includes: transmitting the data in the uplink subframe using a PUSCH. In some cases, transmitting the RS includes: transmitting a DMRS in the uplink subframe. In some cases, transmitting the RS includes: transmitting an SRS in the uplink subframe.

Figure 9:
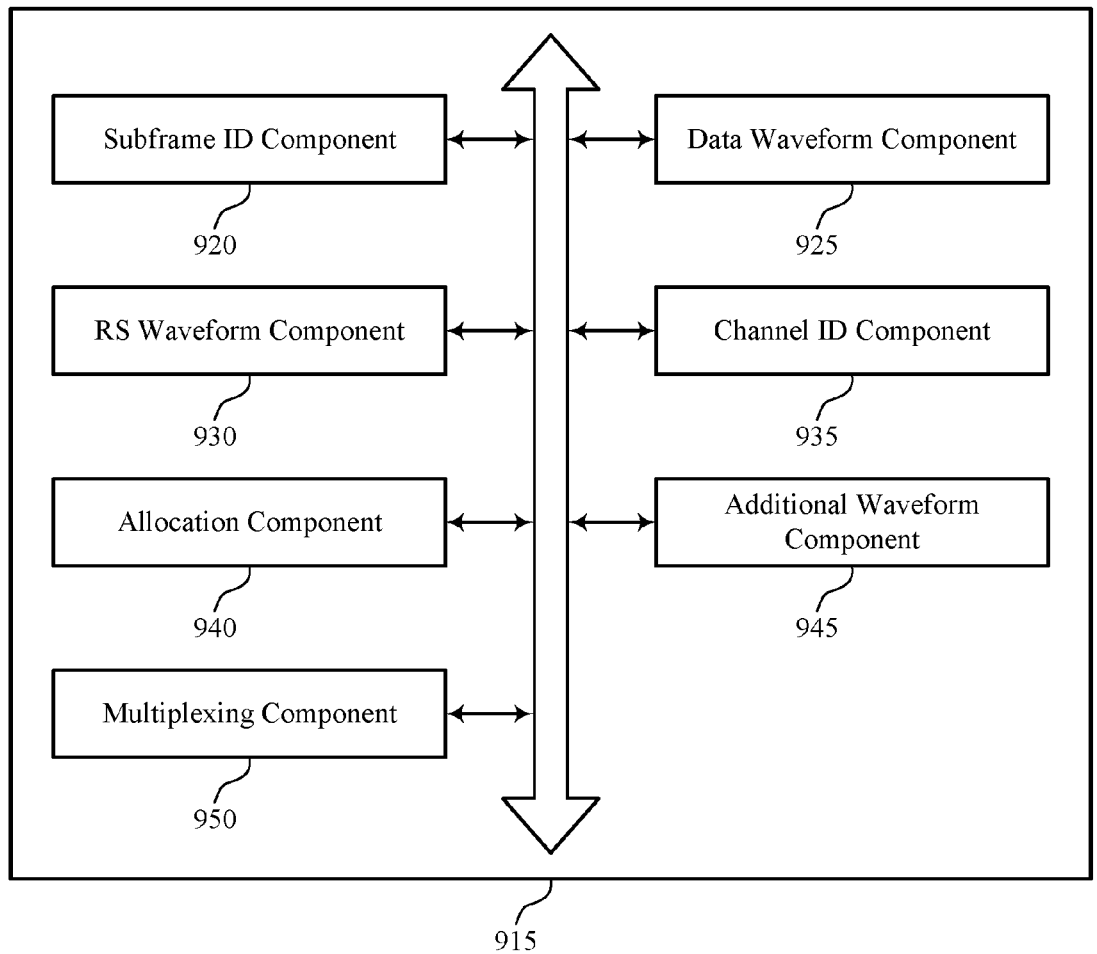

FIG. 9 shows a block diagram 900 of a UE multiplexing and waveform manager 915 that supports uplink channel multiplexing and waveform selection in accordance with one or more aspects of the present disclosure. The UE multiplexing and waveform manager 915 may be an example of aspects of a UE multiplexing and waveform manager 715, a UE multiplexing and waveform manager 815, or a UE multiplexing and waveform manager 1015 described with reference to FIGS. 7, 8, and 10. The UE multiplexing and waveform manager 915 may include subframe ID component 920, data waveform component 925, RS waveform component 930, channel ID component 935, allocation component 940, additional waveform component 945, and multiplexing component 950. Each of these modules may communicate, directly or indirectly, with one another (e.g., via one or more buses).

Subframe ID component 920 may identify an uplink subframe for communication with a base station and identify an additional uplink subframe for communication with the base station.

Data waveform component 925 may select a first waveform for a transmission of data in the uplink subframe. In some cases, the first waveform includes a SC-FDM waveform or an OFDM waveform.

RS waveform component 930 may select a second waveform for transmission of an RS in the uplink subframe. In some cases, the second waveform includes a SC-FDM waveform or an OFDM waveform.

Channel ID component 935 may identify channels to be transmitted in the uplink subframe. In some cases, each identified channel includes one of a PUCCH, or a PUSCH, or an SRS, or a URLCC. In some cases, at least two channels correspond to different UEs. In some cases, at least two channels correspond to a single UE.

Allocation component 940 may allocate a bandwidth and a number of symbols for each identified channel based on a quantity of identified channels. In some cases, the allocated number of symbols for at least one channel spans the uplink subframe. In some cases, the allocated number of symbols for at least one channel differs between the uplink subframe and a subsequent uplink subframe.

Additional waveform component 945 may select a third waveform for an additional transmission of data in the additional uplink subframe, the third waveform being different from the first waveform and select a third waveform for transmission of an additional RS in the additional uplink subframe, the third waveform being different from the second waveform.

Multiplexing component 950 may be responsible for channel and signal multiplexing. In some cases, transmitting the identified channels includes: multiplexing at least a portion of the identified channels in the uplink subframe according to a FDM scheme, or a TDM scheme, or a CDM scheme, or a SDM scheme, or a combination thereof.

Figure 10:
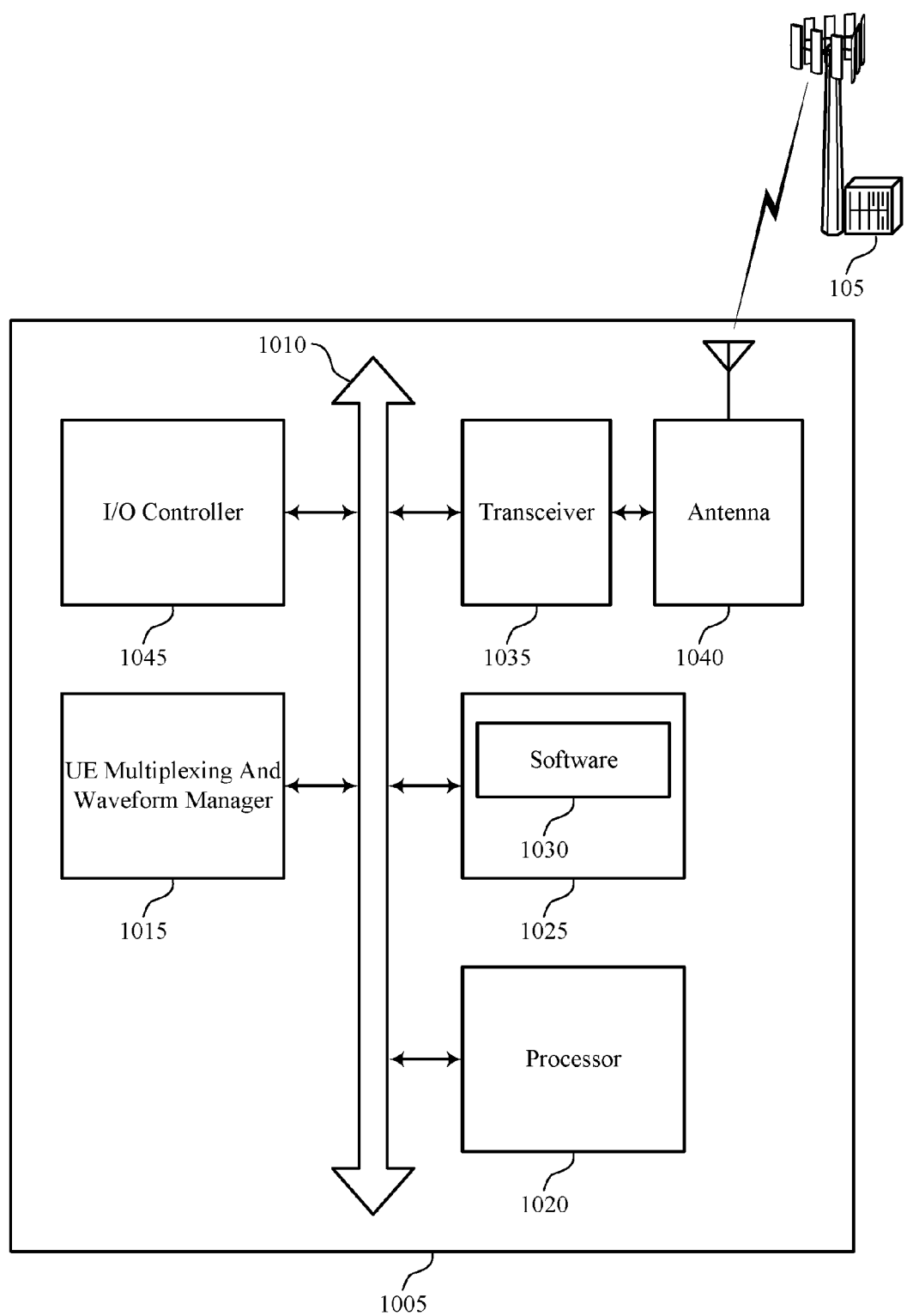
FIG. 10 illustrates a block diagram of a system that supports uplink channel multiplexing and waveform selection in accordance with one or more aspects of the present disclosure.

FIG. 10 shows a diagram of a system 1000 including a device 1005 that supports uplink channel multiplexing and waveform selection in accordance with one or more aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE multiplexing and waveform manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting uplink channel multiplexing and waveform selection). 1020.

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support uplink channel multiplexing and waveform selection. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
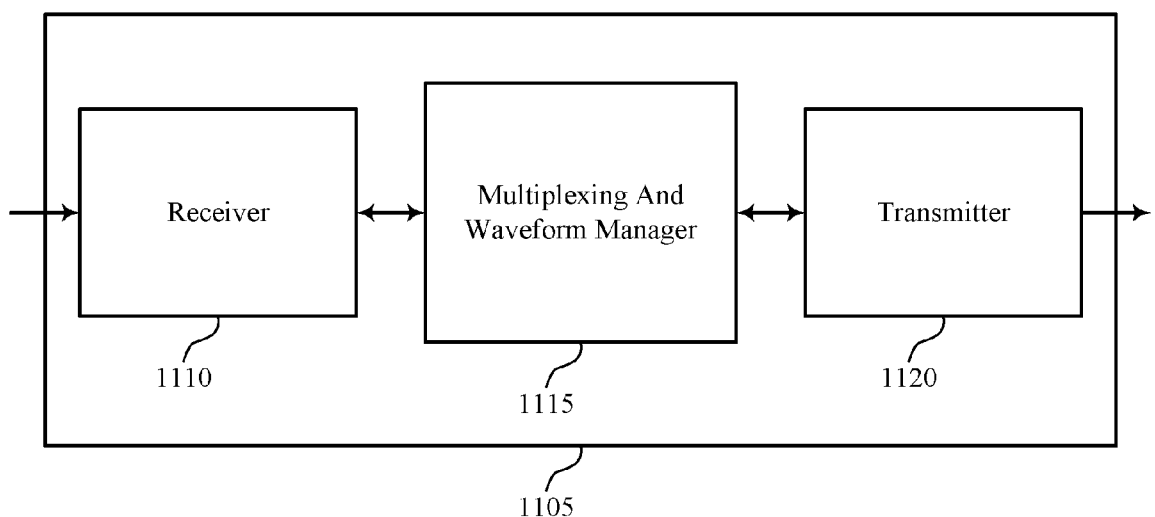
FIGS. 11 through 13 show block diagrams of a device that supports uplink channel multiplexing and waveform selection in accordance with one or more aspects of the present disclosure.

FIG. 11 shows a block diagram 1100 of a wireless device 1105 that supports uplink channel multiplexing and waveform selection in accordance with one or more aspects of the present disclosure. Wireless device 1105 may be an example of aspects of a UE 115 or base station 105 as described with reference to FIG. 1. Wireless device 1105 may include receiver 1110, multiplexing and waveform manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to uplink channel multiplexing and waveform selection, etc.). Information may be passed on to other components of the device. The receiver 1110 may be an example of aspects of the transceiver 1435 described with reference to FIG. 14.

Multiplexing and waveform manager 1115 may be an example of aspects of the Multiplexing and waveform manager 1415 described with reference to FIG. 14. Multiplexing and waveform manager 1115 may identify an uplink subframe and a downlink subframe for communication between a UE and a base station, determine an uplink channel structure for an uplink RS and an uplink data channel to be communicated in the uplink subframe, determine a downlink channel structure for a downlink RS and a downlink data channel to be communicated in the downlink subframe based on the determined uplink channel structure, and communicate the uplink RS and the uplink data channel according to the uplink channel structure and the downlink RS and the downlink data channel according to the downlink channel structure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
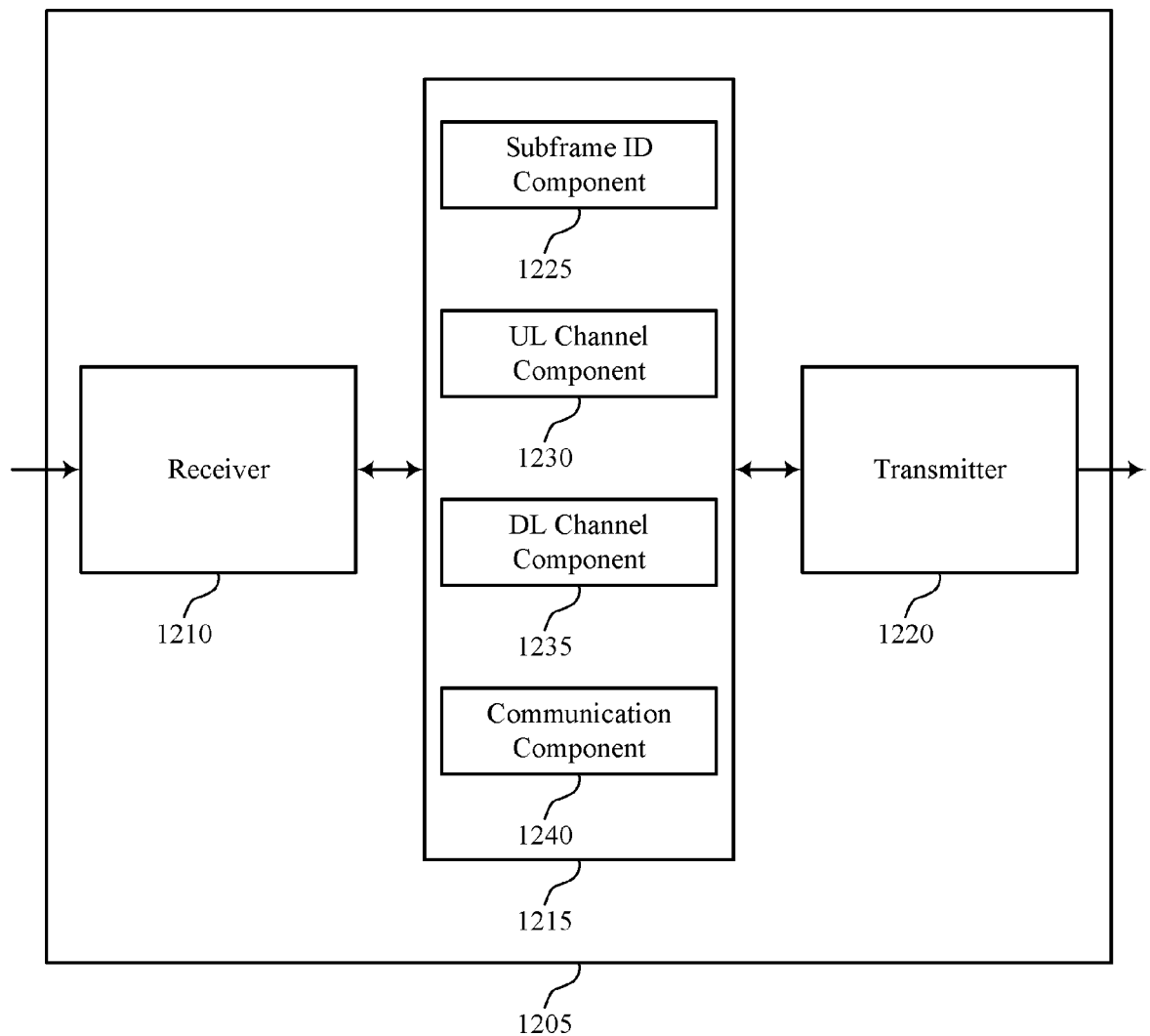

FIG. 12 shows a block diagram 1200 of a wireless device 1205 that supports uplink channel multiplexing and waveform selection in accordance with one or more aspects of the present disclosure. Wireless device 1205 may be an example of aspects of a wireless device 1105 or a UE 115 or base station 105 as described with reference to FIGS. 1 and 11. Wireless device 1205 may include receiver 1210, multiplexing and waveform manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to uplink channel multiplexing and waveform selection, etc.). Information may be passed on to other components of the device. The receiver 1210 may be an example of aspects of the transceiver 1435 described with reference to FIG. 14.

Multiplexing and waveform manager 1215 may be an example of aspects of the multiplexing and waveform manager 1415 described with reference to FIG. 14. Multiplexing and waveform manager 1215 may also include subframe ID component 1225, uplink (UL) channel component 1230, downlink (DL) channel component 1235, and communication component 1240.

Subframe ID component 1225 may identify an uplink subframe and a downlink subframe for communication between a UE and a base station. UL channel component 1230 may determine an uplink channel structure for an uplink RS and an uplink data channel to be communicated in the uplink subframe, select an uplink RS pattern for the uplink RS and an uplink data pattern for the uplink data channel, determine an uplink data waveform for the uplink data channel based on the downlink data waveform, and select an uplink data pattern for the uplink data channel based on the uplink RS pattern. In some cases, determining the uplink channel structure includes: determining an uplink RS waveform for the uplink RS and an uplink data waveform for the uplink data channel. In some cases, determining the uplink channel structure includes: determining an uplink RS waveform for the uplink RS based on the downlink RS waveform. In some cases, determining the uplink channel structure further includes: selecting an uplink RS pattern for the uplink RS based on the downlink RS pattern.

DL channel component 1235 may determine a downlink channel structure for a downlink RS and a downlink data channel to be communicated in the downlink subframe based on the determined uplink channel structure, determine a downlink data waveform for the downlink data channel based on the uplink data waveform, select a downlink data pattern for the downlink data channel based on the downlink RS pattern, and select a downlink RS pattern for the downlink RS and a downlink data pattern for the downlink data channel. In some cases, determining the downlink channel structure includes: determining a downlink RS waveform for the downlink RS based on the uplink RS waveform. In some cases, determining the downlink channel structure further includes: selecting a downlink RS pattern for the downlink RS based on the uplink RS pattern. In some cases, determining the downlink channel structure includes: determining a downlink RS waveform for the downlink RS and a downlink data waveform for the downlink data channel.

Communication component 1240 may communicate the uplink RS and the uplink data channel according to the uplink channel structure and the downlink RS and the downlink data channel according to the downlink channel structure.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
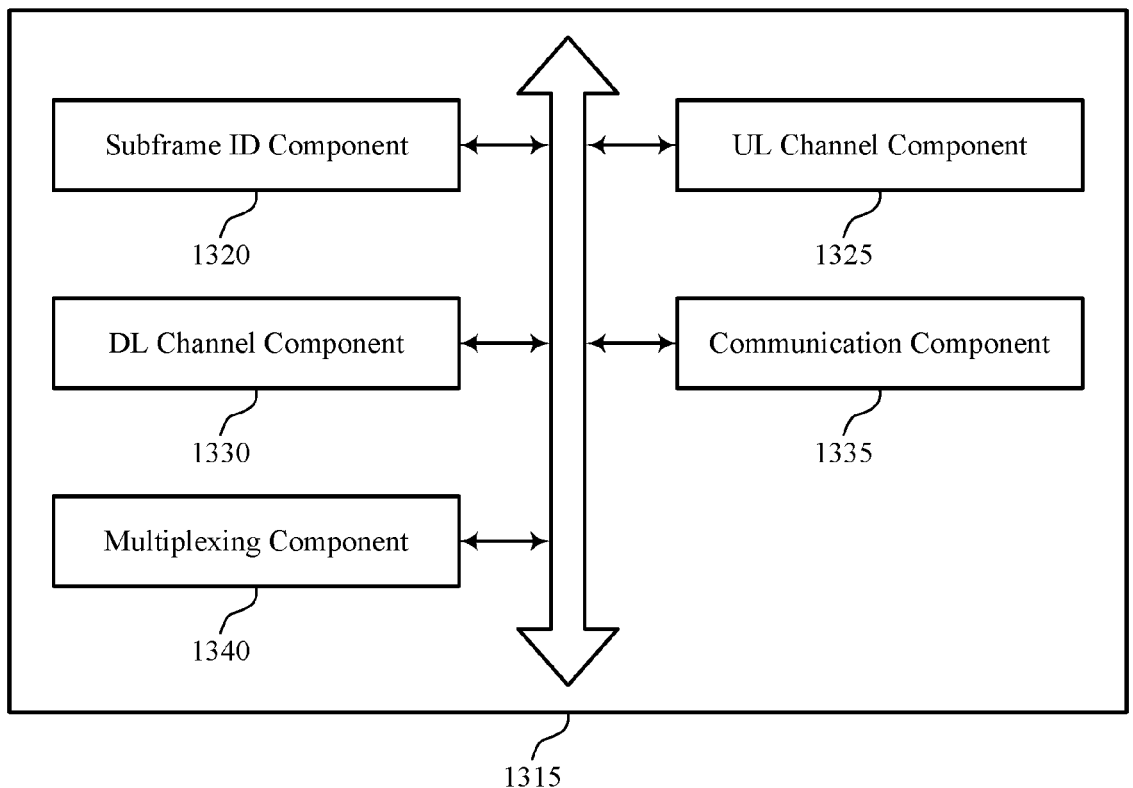

FIG. 13 shows a block diagram 1300 of a multiplexing and waveform manager 1315 that supports uplink channel multiplexing and waveform selection in accordance with one or more aspects of the present disclosure. The multiplexing and waveform manager 1315 may be an example of aspects of a multiplexing and waveform manager 1415 described with reference to FIGS. 11, 12, and 14. The multiplexing and waveform manager 1315 may include subframe ID component 1320, UL channel component 1325, DL channel component 1330, communication component 1335, and multiplexing component 1340. Each of these modules may communicate, directly or indirectly, with one another (e.g., via one or more buses).

Subframe ID component 1320 may identify an uplink subframe and a downlink subframe for communication between a UE and a base station.

UL channel component 1325 may determine an uplink channel structure for an uplink RS and an uplink data channel to be communicated in the uplink subframe, select an uplink RS pattern for the uplink RS and an uplink data pattern for the uplink data channel, determine an uplink data waveform for the uplink data channel based on the downlink data waveform, and select an uplink data pattern for the uplink data channel based on the uplink RS pattern. In some cases, determining the uplink channel structure includes: determining an uplink RS waveform for the uplink RS and an uplink data waveform for the uplink data channel. In some cases, determining the uplink channel structure includes: determining an uplink RS waveform for the uplink RS based on the downlink RS waveform. In some cases, determining the uplink channel structure further includes: selecting an uplink RS pattern for the uplink RS based on the downlink RS pattern.

DL channel component 1330 may determine a downlink channel structure for a downlink RS and a downlink data channel to be communicated in the downlink subframe based on the determined uplink channel structure, determine a downlink data waveform for the downlink data channel based on the uplink data waveform, select a downlink data pattern for the downlink data channel based on the downlink RS pattern, and select a downlink RS pattern for the downlink RS and a downlink data pattern for the downlink data channel. In some cases, determining the downlink channel structure includes: determining a downlink RS waveform for the downlink RS based on the uplink RS waveform. In some cases, determining the downlink channel structure further includes: selecting a downlink RS pattern for the downlink RS based on the uplink RS pattern. In some cases, determining the downlink channel structure includes: determining a downlink RS waveform for the downlink RS and a downlink data waveform for the downlink data channel.

Communication component 1335 may communicate the uplink RS and the uplink data channel according to the uplink channel structure and the downlink RS and the downlink data channel according to the downlink channel structure.

Multiplexing component 1340 may be responsible for channel and signal multiplexing. In some cases, communicating the uplink RS and the downlink RS includes: multiplexing the uplink RS and the downlink RS according to a SC-FDM scheme or an OFDM scheme. In some cases, communicating the uplink data channel and the downlink data channel includes: multiplexing the uplink data channel and the downlink data channel according to a SC-FDM scheme or an OFDM scheme. In some cases, communicating the uplink RS and the uplink data channel according to the uplink channel structure and the downlink RS and the downlink data channel according to the downlink channel structure includes: multiplexing the uplink RS, the uplink data channel, the downlink RS, and the downlink data channel according to a SC-FDM scheme or an OFDM scheme.

Figure 14:
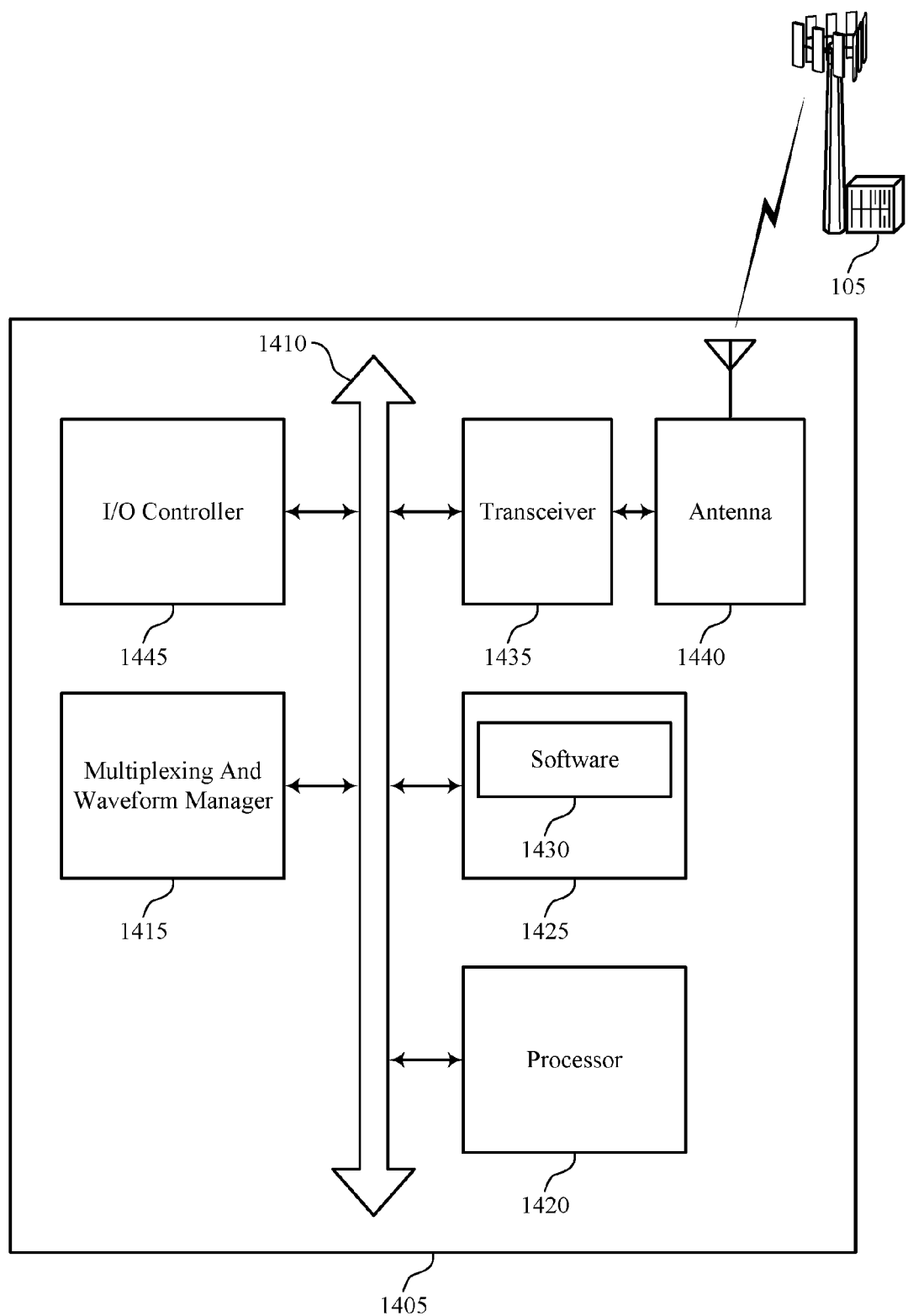
FIG. 14 illustrates a block diagram of a system including a UE that supports uplink channel multiplexing and waveform selection in accordance with one or more aspects of the present disclosure.

FIG. 14 shows a diagram of a system 1400 including a device 1405 that supports uplink channel multiplexing and waveform selection in accordance with one or more aspects of the present disclosure. Device 1405 may be an example of or include the components of UE 115 as described above, e.g., with reference to FIG. 1. Device 1405 may include components for bi-directional voice and data communications including components for transmitting and receiving communications, including multiplexing and waveform manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting uplink channel multiplexing and waveform selection).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support uplink channel multiplexing and waveform selection. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
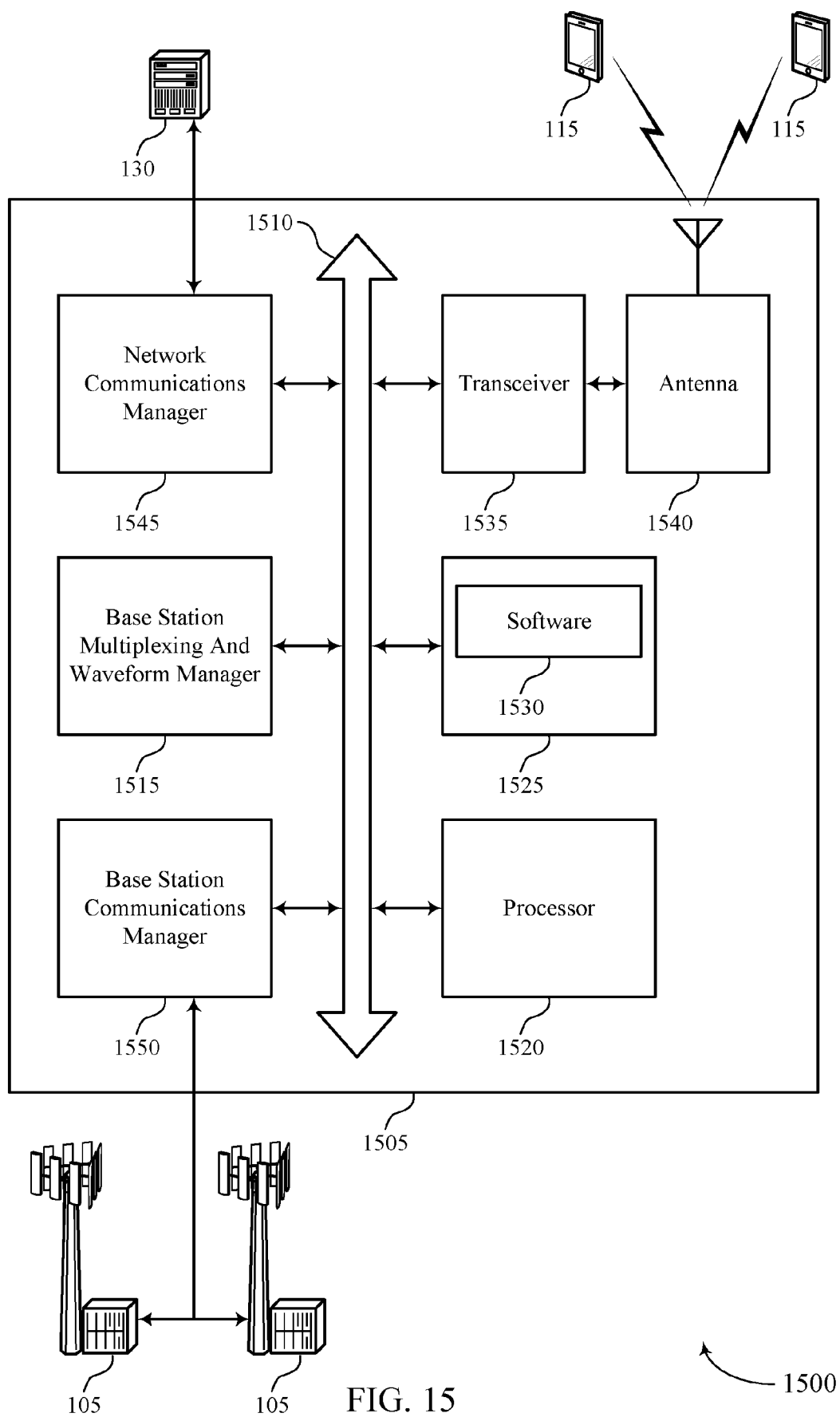
FIG. 15 illustrates a block diagram of a system including a base station that supports uplink channel multiplexing and waveform selection in accordance with one or more aspects of the present disclosure.

FIG. 15 shows a diagram of a system 1500 including a device 1505 that supports uplink channel multiplexing and waveform selection in accordance with one or more aspects of the present disclosure. Device 1505 may be an example of or include the components of base station 105 as described above, e.g., with reference to FIG. 1. Device 1505 may include components for bi-directional voice and data communications including components for transmitting and receiving communications, including base station multiplexing and waveform manager 1515, processor 1520, memory 1525, software 1530, transceiver 1535, antenna 1540, network communications manager 1545, and base station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting uplink channel multiplexing and waveform selection).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support uplink channel multiplexing and waveform selection. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Base station communications manager 1550 may manage communications with other base station 105, and may include a controller or scheduler for controlling communications with UEs 115 in cooperation with other base stations 105. For example, the base station communications manager 1550 may coordinate scheduling for transmissions to UEs 115 for various interference mitigation techniques such as beamforming or joint transmission. In some examples, base station communications manager 1550 may provide an X2 interface within an LTE/LTE-A wireless communication network technology to provide communication between base stations 105.

Figure 16:
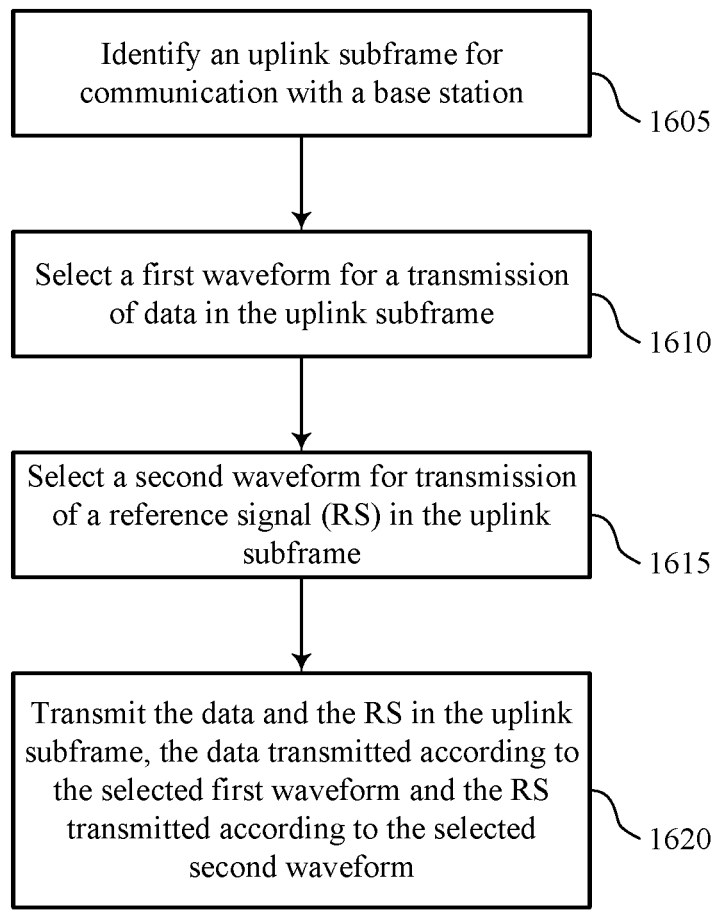
FIGS. 16 through 18 illustrate methods for uplink channel multiplexing and waveform selection in accordance with one or more aspects of the present disclosure.

FIG. 16 shows a flowchart illustrating a method 1600 for uplink channel multiplexing and waveform selection in accordance with one or more aspects of the present disclosure. The operations of method 1600 may be implemented by a UE 115 or its components as described herein. For example, the operations of method 1600 may be performed by a UE multiplexing and waveform manager as described with reference to FIGS. 7 through 14. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may identify an uplink subframe for communication with a base station. The operations of block 1605 may be performed according to the methods described with reference to FIGS. 1 through 6. In some examples, aspects of the operations of block 1605 may be performed by a subframe ID component as described with reference to FIGS. 7 through 14.

At block 1610 the UE 115 may select a first waveform for a transmission of data in the uplink subframe. The operations of block 1610 may be performed according to the methods described with reference to FIGS. 1 through 6. In some examples, aspects of the operations of block 1610 may be performed by a data waveform component as described with reference to FIGS. 7 through 14.

At block 1615 the UE 115 may select a second waveform for transmission of an RS in the uplink subframe. The operations of block 1615 may be performed according to the methods described with reference to FIGS. 1 through 6. In some examples, aspects of the operations of block 1615 may be performed by an RS waveform component as described with reference to FIGS. 7 through 14.

At block 1620 the UE 115 may transmit the data and the RS in the uplink subframe, the data transmitted according to the selected first waveform and the RS transmitted according to the selected second waveform. The operations of block 1620 may be performed according to the methods described with reference to FIGS. 1 through 6. In some examples, aspects of the operations of block 1620 may be performed by a transmitter as described with reference to FIGS. 7 through 14.

Figure 17:
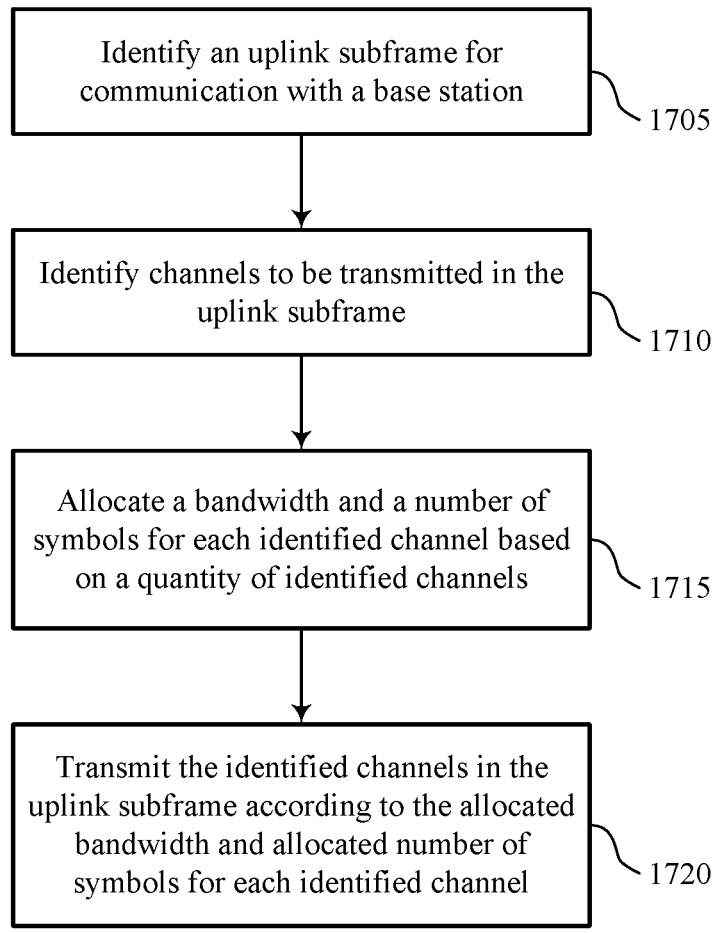

FIG. 17 shows a flowchart illustrating a method 1700 for uplink channel multiplexing and waveform selection in accordance with one or more aspects of the present disclosure. The operations of method 1700 may be implemented by a UE 115 or its components as described herein. For example, the operations of method 1700 may be performed by a UE multiplexing and waveform manager as described with reference to FIGS. 7 through 14. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may identify an uplink subframe for communication with a base station. The operations of block 1705 may be performed according to the methods described with reference to FIGS. 1 through 6. In some examples, aspects of the operations of block 1705 may be performed by a subframe ID component as described with reference to FIGS. 7 through 14.

At block 1710 the UE 115 may identify channels to be transmitted in the uplink subframe. The operations of block 1710 may be performed according to the methods described with reference to FIGS. 1 through 6. In some examples, aspects of the operations of block 1710 may be performed by a channel ID component as described with reference to FIGS. 7 through 14.

At block 1715 the UE 115 may allocate a bandwidth and a number of symbols for each identified channel based at least in part on a quantity of identified channels. The operations of block 1715 may be performed according to the methods described with reference to FIGS. 1 through 6. In some examples, aspects of the operations of block 1715 may be performed by an allocation component as described with reference to FIGS. 7 through 14.

At block 1720 the UE 115 may transmit the identified channels in the uplink subframe according to the allocated bandwidth and allocated number of symbols for each identified channel. The operations of block 1720 may be performed according to the methods described with reference to FIGS. 1 through 6. In some examples, aspects of the operations of block 1720 may be performed by a transmitter as described with reference to FIGS. 7 through 14.

Figure 18:
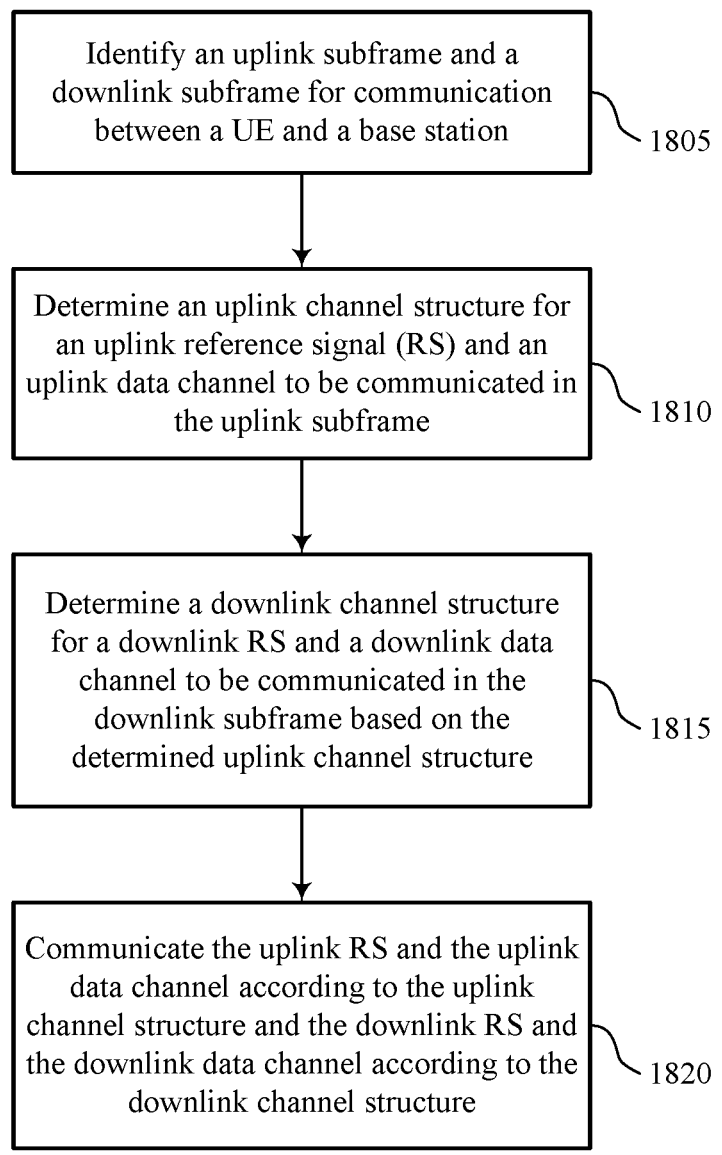

FIG. 18 shows a flowchart illustrating a method 1800 for uplink channel multiplexing and waveform selection in accordance with one or more aspects of the present disclosure. The operations of method 1800 may be implemented by a UE 115 or base station 105 or its components as described herein. For example, the operations of method 1800 may be performed by a Multiplexing and waveform manager as described with reference to FIGS. 11 through 13. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1805 the UE 115 or base station 105 may identify an uplink subframe and a downlink subframe for communication between a UE and a base station. The operations of block 1805 may be performed according to the methods described with reference to FIGS. 1 through 6. In some examples, aspects of the operations of block 1805 may be performed by a subframe ID component as described with reference to FIGS. 11 through 13.

At block 1810 the UE 115 or base station 105 may determine an uplink channel structure for an uplink RS and an uplink data channel to be communicated in the uplink subframe. The operations of block 1810 may be performed according to the methods described with reference to FIGS.

1 through 6. In some examples, aspects of the operations of block 1810 may be performed by a uplink channel component as described with reference to FIGS. 11 through 13.

At block 1815 the UE 115 or base station 105 may determine a downlink channel structure for a downlink RS and a downlink data channel to be communicated in the downlink subframe based at least in part on the determined uplink channel structure. The operations of block 1815 may be performed according to the methods described with reference to FIGS. 1 through 6. In some examples, aspects of the operations of block 1815 may be performed by a DL channel component as described with reference to FIGS. 11 through 13.

At block 1820 the UE 115 or base station 105 may communicate the uplink RS and the uplink data channel according to the uplink channel structure and the downlink RS and the downlink data channel according to the downlink channel structure. The operations of block 1820 may be performed according to the methods described with reference to FIGS. 1 through 6. In some examples, aspects of the operations of block 1820 may be performed by a communication component as described with reference to FIGS. 11 through 13.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may for example be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying one or more channel parameters at a user equipment (UE);
   identifying an uplink subframe for communication with a base station;
   selecting a first waveform associated with a first channel parameter for a transmission of data in the uplink subframe, the first channel parameter comprising a first bandwidth;
   selecting a second waveform associated with a second channel parameter for transmission of a reference signal (RS) in the uplink subframe, the second channel parameter different from the first channel parameter and comprising a second bandwidth; and transmitting the data and the RS in the uplink subframe, the data transmitted according to the selected first waveform and the first channel parameter and the RS transmitted according to the selected second waveform and the second channel parameter, wherein the selected first waveform is different from the selected second waveform.

2. The method of claim 1, further comprising:

identifying an additional uplink subframe for communication with the base station;

selecting a third waveform for an additional transmission of data in the additional uplink subframe, the third waveform being different from the first waveform; and transmitting the data in the additional uplink subframe according to the selected third waveform.

3. The method of claim 1, further comprising:

identifying an additional uplink subframe for communication with the base station;

selecting a third waveform for transmission of an additional RS in the additional uplink subframe, the third waveform being different from the second waveform; and transmitting the additional RS in the additional uplink subframe according to the selected third waveform.

4. The method of claim 1, wherein transmitting the data comprises:

transmitting the data in the uplink subframe using a physical uplink shared channel (PUSCH).

5. The method of claim 1, wherein transmitting the RS comprises:

transmitting a demodulation RS (DMRS) in the uplink subframe.

6. The method of claim 1, wherein transmitting the RS comprises:

transmitting a sounding RS (SRS) in the uplink subframe.

7. The method of claim 1, wherein the first waveform comprises a single carrier frequency division multiplexing (SC-FDM) waveform or an orthogonal frequency division multiplexing (OFDM) waveform.

8. The method of claim 1, wherein the second waveform comprises a single carrier frequency division multiplexing (SC-FDM) waveform or an orthogonal frequency division multiplexing (OFDM) waveform.

9. An apparatus for wireless communication, comprising:

a processor;

memory in electronic communication with the processor; and the processor and memory configured to:

identify one or more channel parameters at a user equipment (UE);

identify an uplink subframe for communication with a base station;

select a first waveform associated with a first channel parameter for a transmission of data in the uplink subframe, the first channel parameter comprising a first bandwidth;

select a second waveform associated with a second channel parameter for transmission of a reference signal (RS) in the uplink subframe, the second channel parameter different from the first channel parameter and comprising a second bandwidth; and transmit the data and the RS in the uplink subframe, the data transmitted according to the selected first waveform and the first channel parameter and the RS transmitted according to the selected second waveform and the second channel parameter, wherein the selected first waveform is different from the selected second waveform.

10. The apparatus of claim 9, wherein the processor and memory are further configured to:

identify an additional uplink subframe for communication with the base station;

select a third waveform for an additional transmission of data in the additional uplink subframe, the third waveform being different from the first waveform; and transmit the data in the additional uplink subframe according to the selected third waveform.

11. The apparatus of claim 9, wherein the processor and memory are further configured to:

identify an additional uplink subframe for communication with the base station;

select a third waveform for transmission of an additional RS in the additional uplink subframe, the third waveform being different from the second waveform; and transmit the additional RS in the additional uplink subframe according to the selected third waveform.

12. The apparatus of claim 9, wherein the processor and memory are further configured to:

transmit the data in the uplink subframe using a physical uplink shared channel (PUSCH).

13. The apparatus of claim 9, wherein the processor and memory are further configured to:

transmit a demodulation RS (DMRS) in the uplink subframe.

* * * * *